United States Patent
Uan-Zo-li et al.

(10) Patent No.: US 12,170,478 B2
(45) Date of Patent: Dec. 17, 2024

(54) MERGED POWER DELIVERY

(71) Applicant: Apple Inc., Cupertino, CA (US)

(72) Inventors: Alexander B. Uan-Zo-li, Hillsboro, OR (US); Shuai Jiang, San Jose, CA (US); Jamie L Langlinais, Los Gatos, CA (US); Per H. Hammarlund, Sunnyvale, CA (US); Hans L Yeager, Chapel Hill, NC (US); Victor Zyuban, Sunnyvale, CA (US); Sung J. Kim, San Carlos, CA (US); Wei Xu, Cupertino, CA (US); Rohan U. Mandrekar, Sunnyvale, CA (US); Sambasivan Narayan, Saratoga, CA (US); Mohamed H. Abu-Rahma, Mountain View, CA (US); Jaroslav Raszka, Morgan Hill, CA (US); Robert O. Bruckner, Gilbert, AZ (US)

(73) Assignee: Apple Inc., Cupertino, CA (US)

( * ) Notice: Subject to any disclaimer, the term of this patent is extended or adjusted under 35 U.S.C. 154(b) by 121 days.

(21) Appl. No.: 17/820,168

(22) Filed: Aug. 16, 2022

(65) Prior Publication Data
US 2024/0063715 A1    Feb. 22, 2024

(51) Int. Cl.
*H02M 1/00* (2007.01)

(52) U.S. Cl.
CPC .................................. *H02M 1/008* (2021.05)

(58) Field of Classification Search
CPC ..... H02M 1/008; H02M 3/1584; H02M 1/007
See application file for complete search history.

(56) References Cited

U.S. PATENT DOCUMENTS

| | | | |
|---|---|---|---|
| 9,673,651 B2 | 6/2017 | Hawawini et al. | |
| 9,823,719 B2 | 11/2017 | Jahagirdar et al. | |
| 10,170,994 B1* | 1/2019 | Gibney | H02M 3/139 |
| 10,234,932 B2 | 3/2019 | Chen et al. | |
| 2008/0273391 A1 | 11/2008 | Steedman et al. | |
| 2009/0058381 A1 | 3/2009 | Kojima et al. | |
| 2011/0057724 A1* | 3/2011 | Pabon | H02M 7/219 |
| | | | 307/31 |

(Continued)

FOREIGN PATENT DOCUMENTS

KR    10-1172005 B1    8/2012

OTHER PUBLICATIONS

International Search Report and Written Opinion in PCT Appl. No. PCT/US2023/029939 mailed Nov. 29, 2023, 9 pages.

*Primary Examiner* — Alex Torres-Rivera
(74) *Attorney, Agent, or Firm* — Kowert, Hood, Munyon, Rankin & Goetzel, P.C.; Dean M. Munyon

(57) ABSTRACT

A power delivery sub-system included in a computer system employs a primary voltage regulator circuit that generates a primary supply voltage on a primary power supply node. The power delivery sub-system also includes multiple bypass voltage regulator circuits that source corresponding bypass currents to a local power supply nodes in an integrated circuit. The integrated circuit includes multiple circuit blocks coupled to corresponding ones of the local power supply nodes, and multiple local voltage regulator circuits coupled to the primary power supply node. When a voltage level of a given local power supply node drops below a threshold value, a corresponding local voltage regulator circuit sources a supply current to the given local power supply node.

20 Claims, 18 Drawing Sheets

(56) References Cited

U.S. PATENT DOCUMENTS

| | | |
|---|---|---|
| 2015/0188421 A1 | 7/2015 | Ko |
| 2017/0131734 A1 | 5/2017 | Balteanu et al. |
| 2018/0115246 A1* | 4/2018 | Azrai .................. G06F 1/26 |
| 2020/0192462 A1 | 6/2020 | Kuehnis et al. |
| 2021/0320590 A1* | 10/2021 | Ng .................. H02M 1/008 |
| 2022/0329149 A1* | 10/2022 | Fong .............. H02M 1/4208 |

* cited by examiner

MERGED POWER DELIVERY

BACKGROUND

Technical Field

This disclosure relates to power management in computer systems and, more particularly, to the use of multiple voltage regulator circuits in a computer system.

Description of the Related Art

Modern computer systems may include multiple circuit blocks designed to perform various functions. For example, such circuit blocks may include processors or processor cores configured to execute software or program instructions. Additionally, the circuit blocks may include memory circuits, mixed-signal or analog circuits, and the like.

In some computer systems, the circuit blocks may be designed to operate using different power supply voltage levels. For example, in some computer systems, power circuits (also referred to as "power management units" or "power management integrated circuits") may generate and monitor various power supply signals. Such power circuits may be located on a common integrated circuit with a processor circuit, memory circuit, and the like. Alternatively, power circuits may be located on different integrated circuits from the processor circuit, memory circuit, etc.

Power circuits often include one or more power converter or voltage regulator circuits configured to generate regulated voltage levels on respective power supply signal lines using a voltage level of an input power supply signal. Such converter circuits may employ multiple reactive circuit elements such as inductors, capacitors, and the like.

SUMMARY OF THE EMBODIMENTS

Computer systems can include multiple circuit blocks that operate using different power supply voltage levels. To provide the different voltage levels, a computer system can include multiple power converters and voltage regulator circuits that use an input power supply to generate power supply voltage levels for the circuit blocks in the computer system. During operation of a computer system, different circuit blocks have different levels of operation at different times. As a result, it is rare that the multiple circuit blocks all consume peak power at the same time, allowing for a primary regulator circuit to be shared by multiple local regulator circuits on the integrated circuit that generate the power supply voltage levels for the circuit blocks on the integrated circuit.

Various embodiments for a power delivery system are disclosed. Broadly speaking, a primary voltage regulator circuit is configured to generate a primary supply voltage. An integrated circuit includes multiple local voltage regulator circuits and multiple functional circuit blocks coupled to corresponding ones of multiple local supply nodes. Multiple bypass voltage regulator circuits are configured to source multiple bypass currents to corresponding ones of the multiple local supply nodes. The multiple local voltage regulator circuits include a particular local voltage regulator circuit configured to source, using the primary supply voltage, a supply current to a corresponding local supply node of the multiple local supply nodes in response to a determination that a voltage level of the corresponding local supply node is less than a threshold value.

DETAILED DESCRIPTION OF EMBODIMENTS

Computer systems may include multiple circuit blocks configured to perform specific functions. The circuit blocks included in a computer system may be fabricated on a common substrate and may employ different power supply voltage levels. Power circuits (also referred to as "power management units" or "PMUs") are used to generate the different power supply voltage levels. In some cases, the power circuits may be located on dedicated integrated circuits. In such cases, power circuits may be referred to as "power management integrated circuits" or "PMICs."

Power circuits may include multiple power converter or voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Individual power converter or voltage regulator circuits are typically designed to be able to supply sufficient energy under a worst-case load. To provide for the worst case load conditions, high-value passive devices and active circuit elements are often used. Such devices and elements can be expensive and can result in a large form factor for a power converter or voltage regulator circuit, which can complicate the design and increase the cost of motherboard designs.

During operation of a computer system, different circuit blocks have different levels of operation at different times. For example, when a central processing unit ("CPU") is operating with a higher power supply voltage for peak performance, other circuit blocks may be operating with lower power supply voltages. Moreover, a computer system may include circuits that monitor temperature or performance metrics of the computer system, and limit the performance of some circuit blocks based on the monitored information. As a result, it is rare that the multiple circuit blocks all consume peak power at the same time.

Since not all circuit blocks draw peak power at the same time, a more efficient power delivery system can be employed. Rather than using multiple power converters designed for the worst-case power consumption of circuit blocks on an integrated circuit, multiple bypass regulator circuits can be employed to generate voltage levels on local power supply nodes of an integrated circuit. A primary regulator circuit can generate a primary supply voltage which can be shared by multiple local voltage regulator circuits located on the integrated circuit to clamp the voltage of the local power supply nodes during periods when load current demand exceeds the bypass regulator circuits capabilities.

Figure 1:
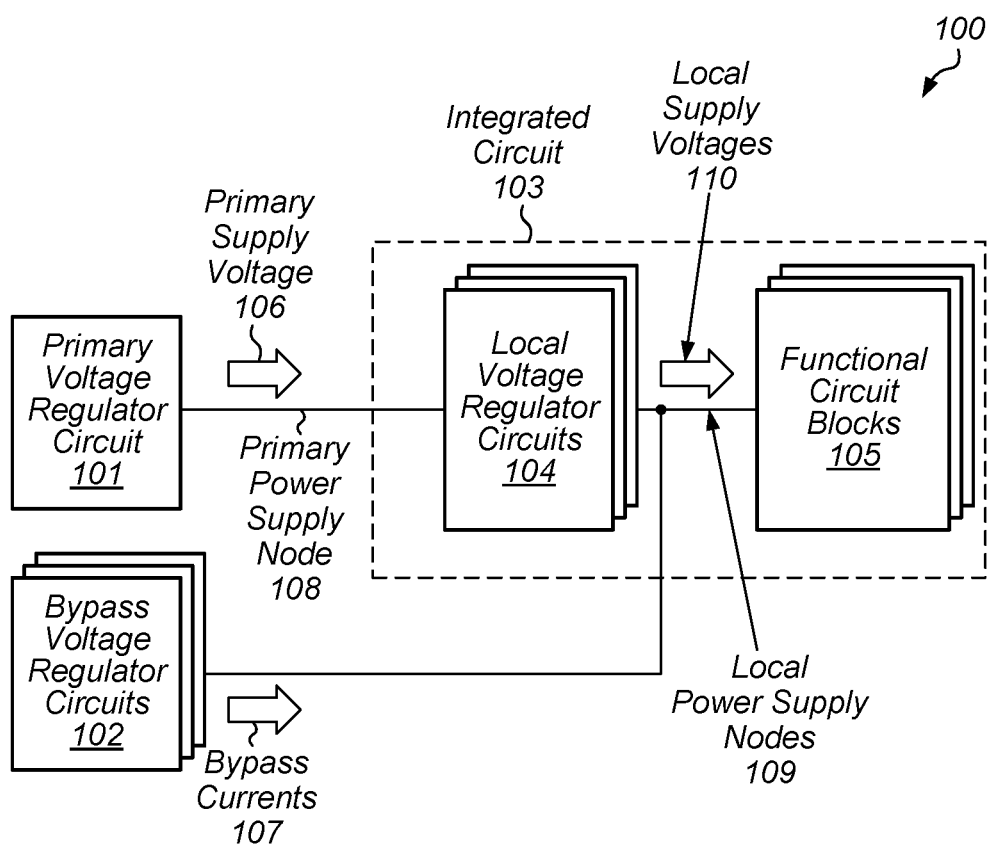
FIG. 1 is a block diagram of an embodiment of a computer system that includes primary and bypass regulator circuits.

A block diagram depicting an embodiment of a computer system that employs primary and bypass voltage regulator circuits is depicted in FIG. 1. As illustrated computer system 100 includes primary voltage regulator circuit 101, bypass voltage regulator circuits 102, and integrated circuit 103.

Primary voltage regulator circuit 101 is configured to generate primary supply voltage 106 on primary power supply node 108. In various embodiments, primary voltage regulator circuit 101 may be implemented using a buck converter circuit, a boost converter circuit, a switched-capacitor circuit, or any other suitable circuit configured to maintain a particular voltage level on primary power supply node 108.

Integrated circuit 103 includes functional circuit blocks 105 coupled to corresponding ones of local power supply nodes 109. Bypass voltage regulator circuits 102 are configured to source bypass currents 107 to corresponding ones of local power supply nodes 109 included in integrated circuit 102, in order to generate voltage levels on local power supply nodes 109. In various embodiments, the values bypass currents 107 are adjusted by bypass voltage regulator circuits 102 to maintain desired voltage levels on local power supply nodes 109.

Variations in load currents drawn by functional circuit blocks 105 can cause drops in the voltage levels of local power supply nodes 109. In some cases, bypass voltage regulator circuits 102 cannot adapt quickly enough to the changes in load currents, resulting in drops in the voltage levels of local power supply nodes 109. Such drops in the voltage levels of local power supply nodes 109 can result in decreased performance or functional failures within functional circuit blocks 105.

To reduce such drops in the voltage levels of local power supply nodes 109, integrated circuit 103 includes functional circuit blocks 105 coupled to corresponding ones of local power supply nodes 109. Each local voltage regulator circuit of local voltage regulator circuits 104 is configured to clamp, using primary supply voltage 106, a voltage level of a corresponding local power supply node of local power supply nodes 109 using primary supply voltage 106. As described below, to clamp the voltage level of a given local power supply node, a corresponding local voltage regulated circuit is configured to source a supply current to the given local power supply node in response to a determination that a voltage level of the given local power supply node is less than a threshold value. By clamping the voltage levels of local power supply nodes 109, drops in the voltage levels of local power supply nodes 109 of can be reduced, thereby reducing the likelihood of any decrease in performance or functional failures in functional circuits blocks 105.

Figure 2:
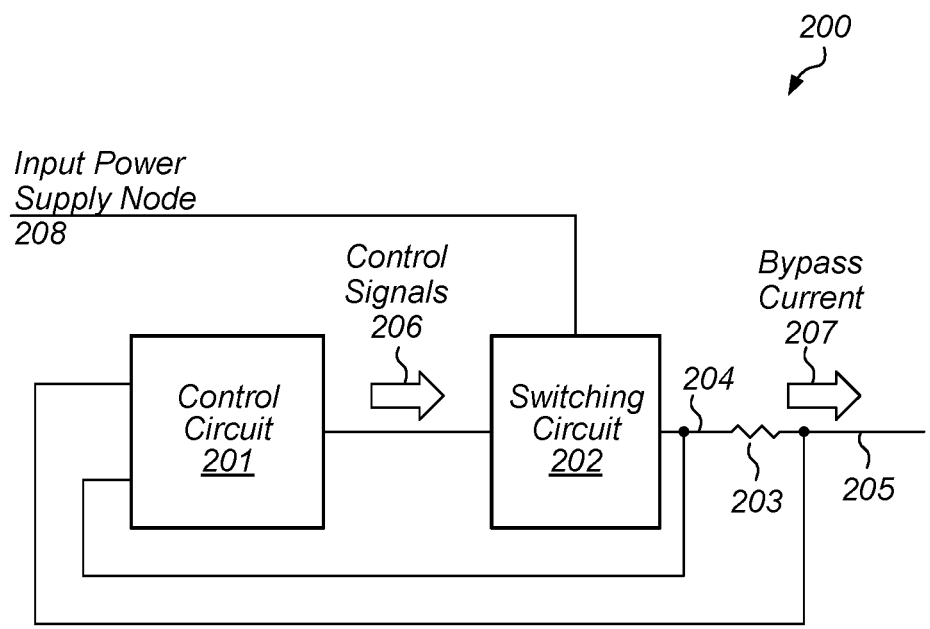
FIG. 2 is a block diagram of an embodiment of a bypass regulator circuit.

Turning to FIG. 2, a block diagram of an embodiments of a bypass voltage regulator circuit is depicted. As illustrated, bypass voltage regulator circuit 200 includes control circuit 201, switching circuit 202, and resistor 203. In various embodiments, bypass voltage regulator circuit 200 may correspond to any of bypass voltage regulator circuits 102 as depicted in FIG. 1.

Switching circuit 202 is configured to generate bypass current 207 using control signals 206 and a voltage level of input power supply node 208. In various embodiments, bypass current 207 may correspond to any of bypass currents 107 as depicted in FIG. 1. To generate bypass current 207, switching circuit 202 may be further configured to switching one or more passive circuit elements, e.g., inductors and/or capacitors, between different electrical configurations. Such passive circuit elements may be included on a common integrated circuit with bypass voltage regulator circuit 200, or may be discrete components mounted on a common circuit board along with an integrated circuit that includes bypass voltage regulator circuit 200.

Switching circuit 202 may be implemented as a boost converter configured to generate an output voltage on node 204 greater than a voltage level of input power supply node 208. Alternatively, switching circuit 202 may be implemented as a buck converter configured to generate an output voltage on node 204 less than the voltage level of input power supply node 208. It is noted that other types of power converter circuits configured to implement bypass voltage regulator circuit 200 are possible and contemplated.

Control circuit 201 is configured to generate control signals 206 using respective voltage levels of nodes 204 and 205. In various embodiments, control circuit 201 may be further configured to determine a value for bypass current 207 using the respective voltage levels of nodes 204 and 205. As bypass current 207 flows through resistor 203, a voltage drop is developed across resistor 203 causing the respective voltage levels of nodes 204 and 205 to be different. Control circuit 201 may be configured to determine a value for bypass current 207 by dividing a difference between the respective voltage levels of nodes 204 and 205 by a value of resistor 203.

In various embodiments, control circuit 201 may be configured to change the values of control signals 206 to modify the electrical configuration of passive circuit elements in switching circuit 202 based on the value of bypass current 207. For example, in some cases, control circuit 201 may be configured to change the values of control signals 206 in response to the value of bypass current 207 reaching a threshold value. Control circuit 201 may be implemented using one or more comparator circuits along with any suitable combination of combinatorial and sequential logic circuits.

In various embodiments, resistor 203 may be implemented using polysilicon, metal, or any other suitable material available on a semiconductor manufacturing process. In other embodiments, resistor 203 may be a discrete component mounted on a common circuit board along with bypass voltage regulator circuit 200.

Figure 3:
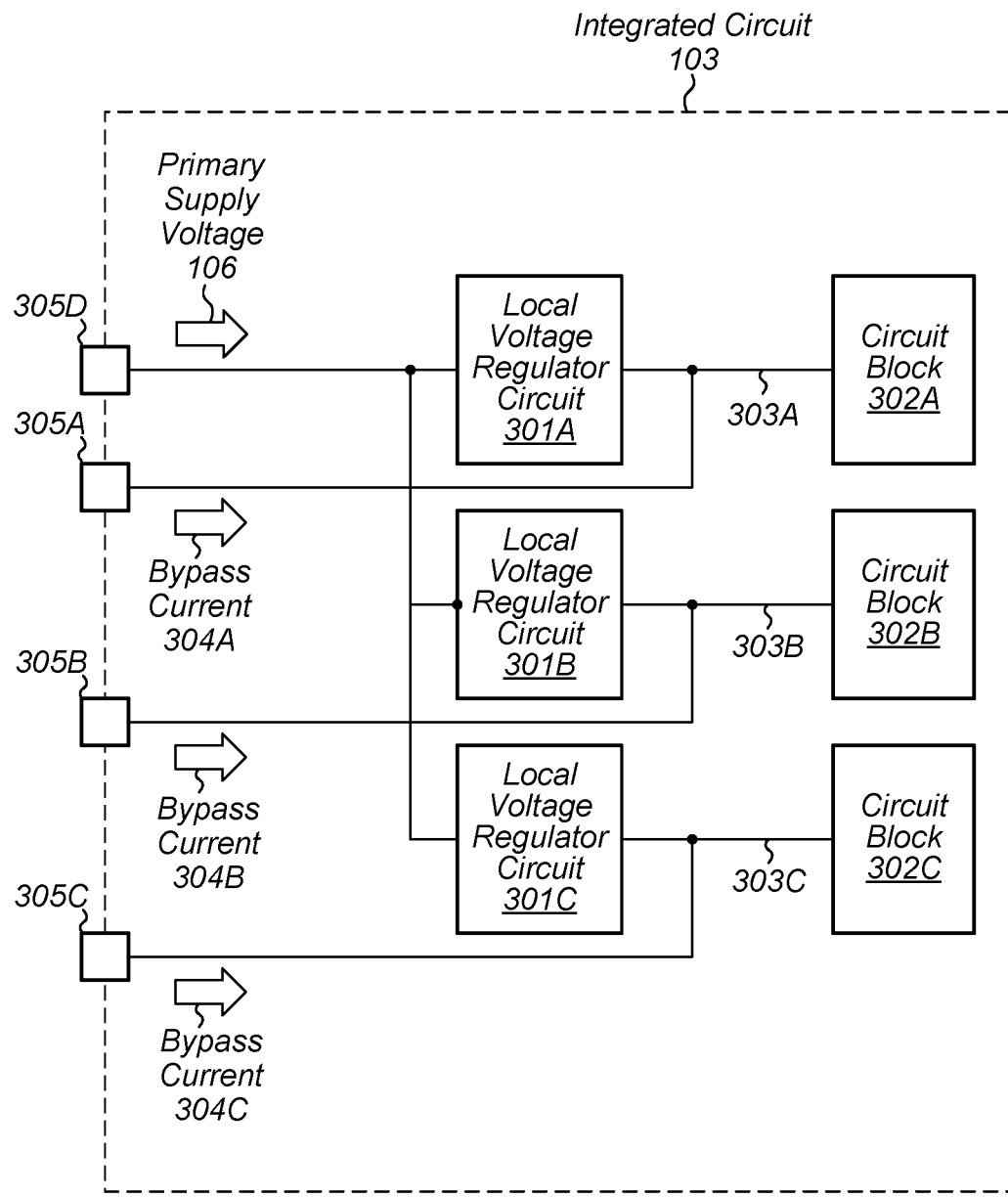
FIG. 3 illustrates a block diagram of an embodiment of an integrated circuit that includes local voltage regulator circuits.

Turning to FIG. 3, a block diagram of an embodiment of integrated circuit 103 is depicted. As illustrated, integrated circuit 103 includes local voltage regulator circuits 301A-301C, circuit blocks 302A-302C, and ports 305A-D. It is noted that although only three circuit blocks and three local voltage regulator circuits are depicted in the embodiment of FIG. 3, in other embodiments, any suitable number of circuits blocks and local voltage regulator circuits may be employed.

Local voltage regulator circuits 301A-C are configured to clamp corresponding voltage levels on local power supply nodes 303A-C using primary supply voltage 106, which is supplied to integrated circuit 103 via port 305D. In various embodiments, local power supply nodes 303A-C may be included in local power supply nodes 109 as depicted in FIG. 1. In some cases, the voltages generated by local voltage regulator circuits 301A-C may be different. As described below, local voltage regulator circuits 301A-C may be implemented using a variety of circuit topologies, such as low-dropout (LDO) voltage regulator circuits. In various embodiments, local voltage regulator circuits 301A-C can respond more quickly to changes in load current demand than bypass regulator circuits 102, thereby reducing durations of voltage transients on local power supply nodes 303A-C.

Bypass currents 304A-C are sourced to local power supply nodes 303A-C via ports 305A-C, respectively, to generate respective voltage levels on local power supply nodes 303A-C. As described above, bypass currents 304A-C may be generated using buck converter circuits, switched-capacitor regulator circuits, or any other suitable voltage regulator or power converter circuits.

In various embodiments, circuit blocks 302A-C are configured to perform respective functions or operations using respective voltage levels of local power supply nodes 303A-C. Circuit blocks 302A-C may, in different embodiments, include any suitable types of analog and/or digital circuits, such as processor circuits, memory circuits, analog/mixed-signal circuits, input/output circuits, and the like.

In various embodiments, ports 305A-D may be implemented as solder bumps or balls on integrated circuit 103. Although a single port is depicted for each of primary supply voltage 106, and bypass currents 304A-C in FIG. 3, in other embodiments, multiple ports may be used for any given one of primary supply voltage 106 and bypass currents 304A-C.

Figure 4:
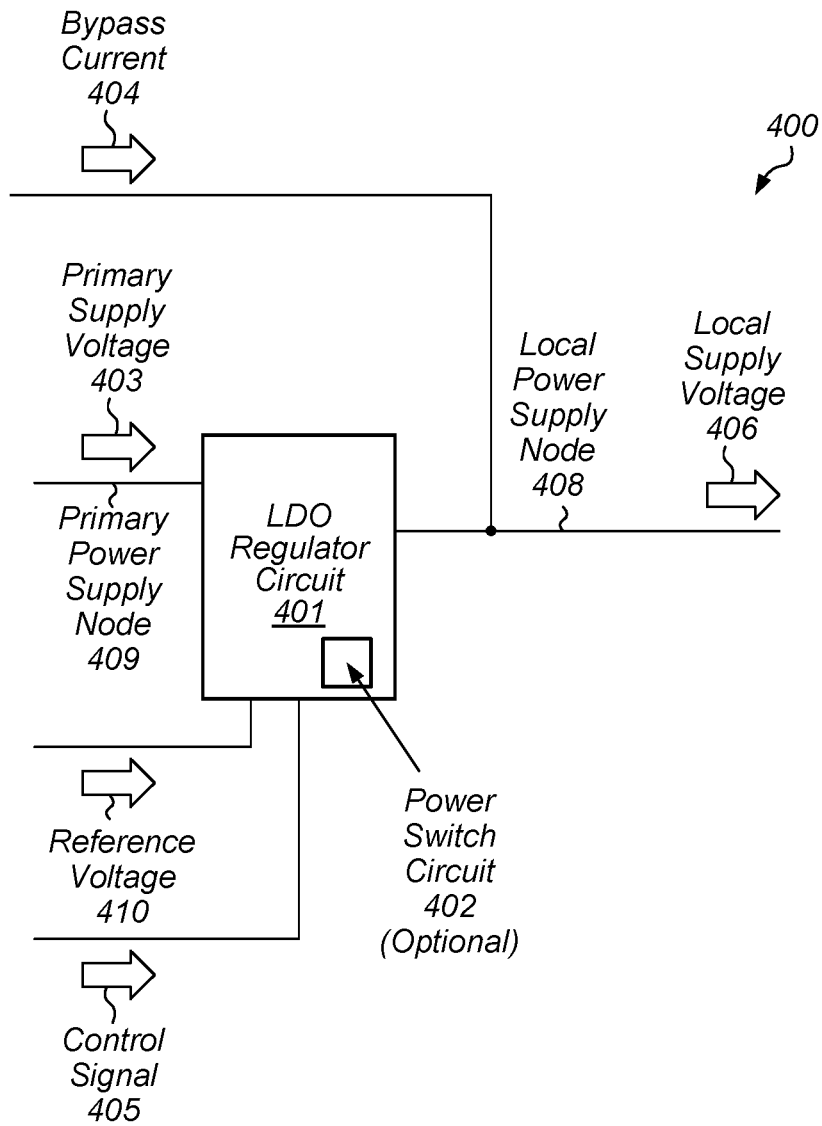
FIG. 4 illustrates a block diagram of an embodiment of local voltage regulator circuit.

Turning to FIG. 4, a block diagram of an embodiment of a local voltage regulator circuit is depicted. As illustrated, local voltage regulator circuit 400 includes a low-dropout regulator circuit (denoted as "LDO regulator circuit 401). In various embodiments, local voltage regulator circuit 400 can correspond to any of local voltage regulator circuits 104 or local voltage regulator circuits 301A-301C.

LDO regulator circuit 401 is configured to generate local supply voltage 406 on local power supply node 408. To generate local supply voltage 406, LDO regulator circuit 401 may, in some embodiments, be configured to adjust a conductance between primary power supply node 409 local power supply node 408. In various embodiments, LDO regulator circuit 401 may include one or more devices, e.g., metal-oxide semiconductor field-effect transistors (MOSFETs), Fin field-effect transistors (FinFETs), gate-all-around field-effect transistors (GAAFETs), or any other suitable transconductance devices) coupled between primary power supply node 409 and local power supply node 408. LDO regulator circuit 401 may be configured to adjust the on-resistance of the one or more devices based on a comparison of local supply voltage 406 to reference voltage 410.

In some cases, LDO regulator circuit 401 may include optional power switch circuit 402, which is configured to de-couple local power supply node 408 from primary power supply node 409 based on control signal 405. In some cases, power switch circuit 402 may be further configured to prevent the injection of bypass current 404 onto local power supply node 408 based on control signal 405. In various embodiments, a state of control signal 405 may be based on power gating information from within an integrated circuit (e.g., integrated circuit 103), or on power gating information received from an external power management integrated circuit.

Figure 5:
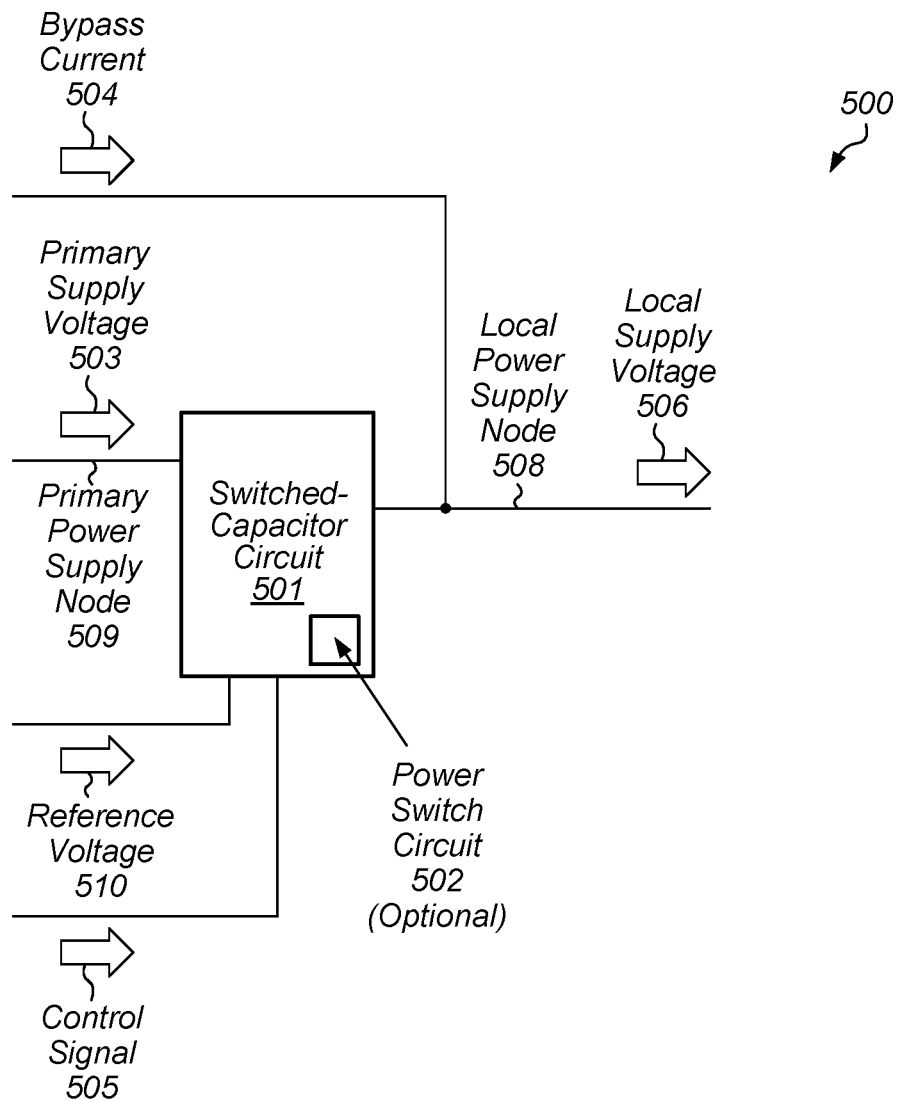
FIG. 5 illustrates a block diagram of another embodiment of a local voltage regulator circuit.

Turning to FIG. 5, a block diagram of another embodiment of a local voltage regulator circuit is depicted. As illustrated, local voltage regulator circuit 500 includes switched-capacitor circuit 501 and optional power switch circuit 502. In various embodiments, local voltage regulator circuit 500 can correspond to any of local voltage regulator circuits 104 or local voltage regulator circuits 301A-301C.

Switched-capacitor circuit 501 is configured to generate local supply voltage 506 on local power supply node 508. To generate local supply voltage 506, switched-capacitor circuit 501 may, in some embodiments, be configured to charge one or more capacitors using primary supply voltage 503, and then discharge the one or more capacitors into local power supply node 508. In addition to capacitors, switched-capacitor circuit 501 may further include one or more devices such as MOSFET, FinFETs, GAAFETs, or any other suitable transconductance devices.

In some cases, switched-capacitor circuit 501 may include optional power switch circuit 502, which is configured to de-couple local power supply node 508 from primary power supply node 509 based on control signal 505. In some cases, power switch circuit 502 may be further configured to prevent the injection of bypass current 504 onto local power supply node 508 based on control signal 505. In various embodiments, a state of control signal 505 may be based on power gating information from within an integrated circuit (e.g., integrated circuit 103), or on power gating information received from an external power management integrated circuit.

Figure 6:
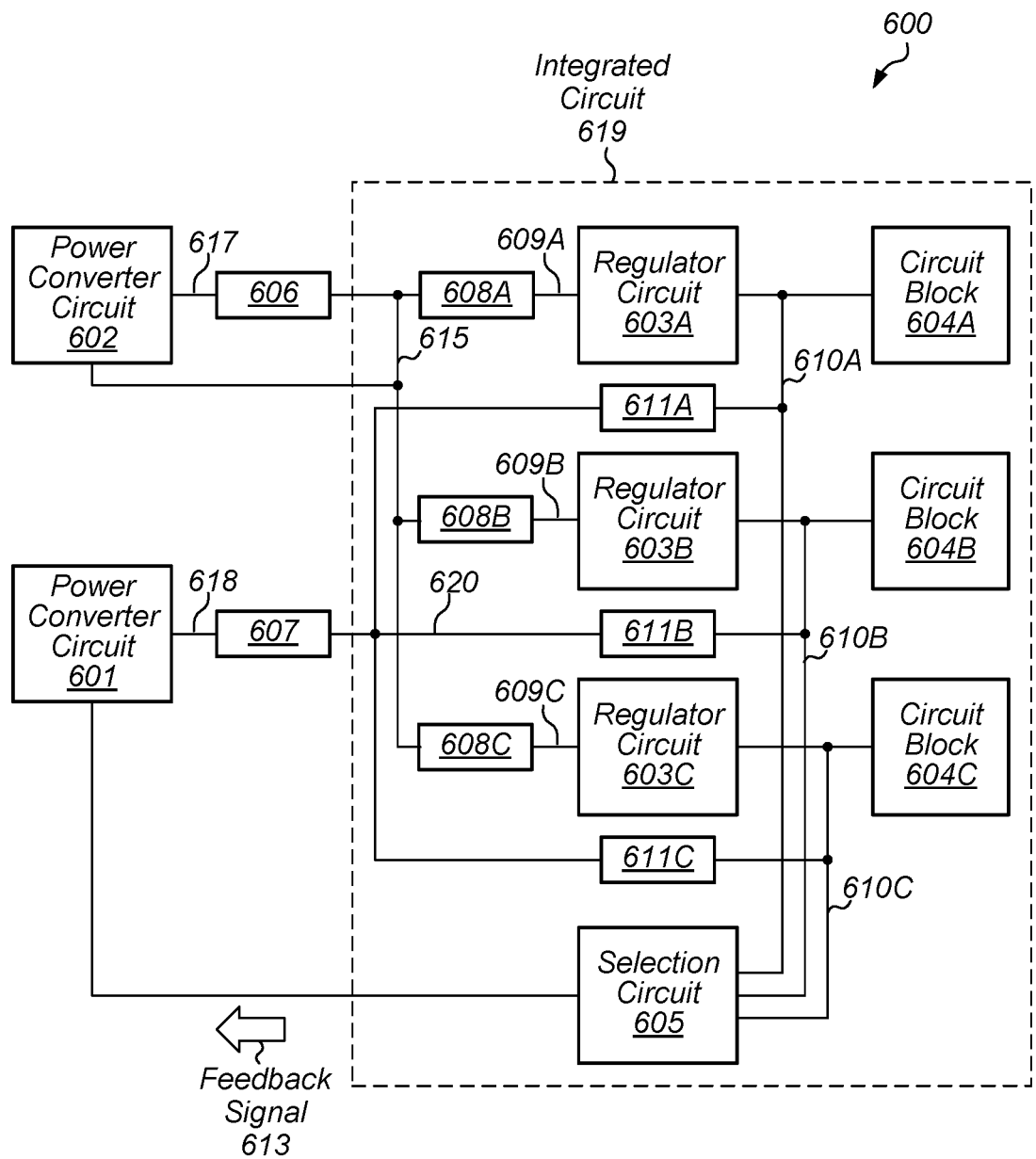
FIG. 6 is a block diagram of an embodiment of a power delivery sub-system for a computer system.

Turning to FIG. 6, a block diagram of an embodiment of a power delivery sub-system for a computer system is depicted. As illustrated, power delivery sub-system 600 includes power converter circuit 601, power converter circuit 602, and integrated circuit 619, which includes regulator circuits 603A-603C, circuit blocks 604A-604C, and selection circuit 605.

Power converter circuit 601 (also referred to as a "primary power converter circuit") is configured to generate a particular voltage level on node 618, which is transferred to node 620 via wiring 607. In various embodiments, wiring 607 may correspond to parasitic circuit elements, e.g., resistors, inductors, capacitors, etc., associated with wiring traces, solder bumps, and the like, between power converter circuit 601 and integrated circuit 619. Power converter circuit 601 may, in various embodiments, be implemented as a buck converter, a boost converter, or any other suitable type of power converter circuit.

The voltage level on node 620 is transferred to local power supply nodes 610A-610C via wiring 611A-611C. In various embodiments, wiring 608A-608C may correspond to parasitic circuit elements, e.g., resistors, inductors, capacitors, etc., associated with metal traces, contacts, vias, and the like, included on integrated circuit 619.

Circuit block 604A is configured to draw power from local power supply node 610A. In a similar fashion, circuit blocks 604B and 604C are configured to draw power from local power supply nodes 610B and 610C, respectively. In various embodiments, circuit blocks 604A-604C may include any suitable combination of processor circuits, processor cores, memory circuits, analog/mixed-signal circuits, and the like.

In some cases, current demand fluctuations by circuit blocks 604A-604C can exceed what power converter circuit 601 can supply, resulting in local power supply nodes 610A-610C dropping from their desired levels. Such drops in the voltage levels of local power supply nodes 610A-610C can result in reduced performance and/or functional failures within circuit blocks 604A-604C. In order to prevent the voltage level of local power supply nodes 610A-610C from dropping too low, power converter circuit 601 is often over-designed to supply extra current, which results in larger components and increased power dissipation within power converter circuit 601.

Rather than relying on solely on the capabilities of power converter circuit 601, power delivery sub-system 600 employs regulator circuits 603A-603C to source additional current to local power supply nodes 610A-610C during periods of increased current demand from circuit blocks 604A-604C. Regulator circuits 603A-603C are configured to generate particular voltage levels on local power supply nodes 610A-610C, respectively. As described below, regulator circuits 603A-603C may be implemented as digital low-dropout (LDO) regulator circuits configured to adjust conductance values between auxiliary power supply nodes 609A-609C and local power supply nodes 610A-610C, respectively.

Power converter circuit 602 is configured to generate a particular voltage level on node 617, which is transferred to node 615 via wiring 606. In various embodiments, wiring 606 may correspond to parasitic circuit elements, e.g., resistors, inductors, capacitors, etc., associated with wiring traces, solder bumps, and the like, between power converter circuit 602 and integrated circuit 619. Power converter circuit 602 may, in various embodiments, be implemented as a buck converter, a boost converter, or any other suitable type of power converter circuit.

The voltage level on node 615 is propagated to auxiliary power supply nodes 609A-609C via wiring 608A-608C, respectively. In various embodiments, wiring 608A-608C may correspond to parasitic circuit elements, e.g., resistors, inductors, capacitors, etc., associated with metal traces, contacts, vias, and the like, included on integrated circuit 619.

To further increase the transient and voltage drop performance of power delivery sub-system 600, selection circuit 605 is configured to select one of local power supply nodes 610A-610C to generate feedback signal 613. As described below, selection circuit 605 may be further configured to select the one of local power supply nodes 610A-610C that has a lowest voltage level. By generating feedback signal 613 based on the local power supply node with the lowest voltage level, power converter circuit 601 can adjust its current output based on a worst-case voltage level of local power supply nodes 610A-610C, thereby improving the response to changes in the respective voltage levels of local power supply nodes 610A-610C.

It is noted that although only three circuit blocks and three regulator circuits are depicted as being included in integrated circuit 619, in other embodiments, any suitable number of regulator circuits and circuit blocks may be employed. It is further noted that although a single circuit block is depicted as being coupled to one of local power supply nodes 610A-610C, in other embodiments, multiple circuit blocks may be coupled to any of local power supply nodes 610A-610C.

Figure 7:
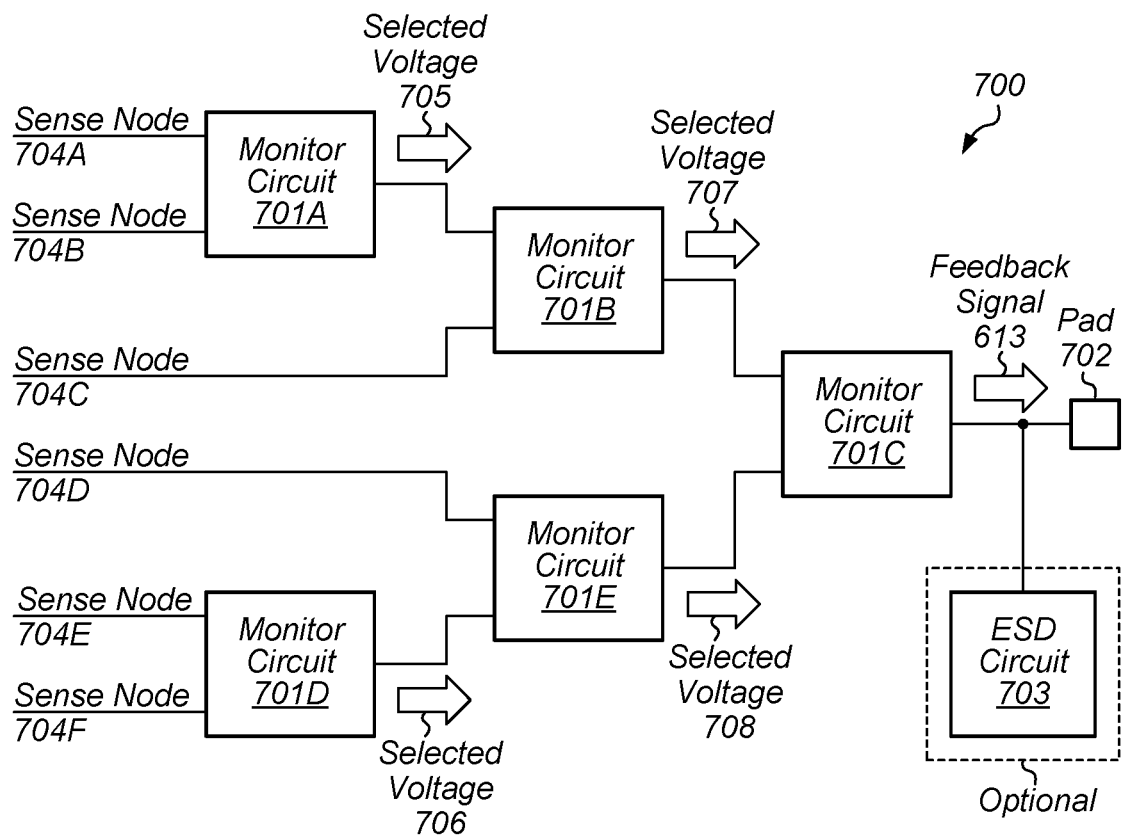
FIG. 7 is a block diagram of an embodiment of a selection circuit for use in a power delivery sub-system.

Turning to FIG. 7, a block diagram of an embodiment of a selection circuit for use in a power delivery sub-system is depicted. As illustrated, selection circuit 700 includes monitor circuits 701A-701E, pad 702, and an optional electrostatic discharge circuit (denoted as "ESD circuit 703"). It is noted that although only five monitor circuits are depicted in selection circuit 700, in other embodiments, additional monitor circuits may be employed. In general, the more local power supply nodes to be sensed or monitored, the more monitor circuits are employed. It is noted that sense nodes 704A-704F may correspond to any of local power supply nodes 610A-610C.

Monitor circuit 701A is configured to compare respective voltage levels of sense nodes 704A and 704B, and generate selected voltage 705. In various embodiments, to generate selected voltage 705, monitor circuit 701A may be further configured to generate selected voltage 705 such that a value of selected voltage 705A is the minimum between the respective voltage levels of sense nodes 704A and 704B. In a similar fashion, monitor circuit 701D is configured to generate selected voltage 706 by comparing respective voltage levels of sense nodes 704E and 704F.

Monitor circuit 701B is configured to generate selected voltage 707 using selected voltage 705 and a voltage level of sense node 704C, while monitor circuit 701E is configured to generate selected voltage 708 by comparing selected voltage 706 and a voltage level of sense node 704D. In various embodiments, monitor circuits 701B and 701E may be configured to select a minimum of the respective input signals to generate their respective output signals.

Monitor circuit 701C is configured to generate feedback signal 613 by comparing selected voltage 707 and selected voltage 708. In various embodiments, to generate feedback signal 613, monitor circuit 701C may be further configured to generate feedback signal 613 such that a voltage level of feedback signal 613 is the same as the smaller of selected voltage 707 and selected voltage 708. Monitor circuit 701C may be further configured to drive feedback signal 613 onto pad 702, where it can be routed to an external power converter circuit, such as power converter circuit 602.

Although each of the monitor circuits described above are configured to generate their respective selected voltage signals based on a minimum of their respective input voltage levels, in other embodiments, monitor circuits can be configured to generate selected voltage levels based on a maximum of their respective voltage levels. While a minimum voltage level can be used to regulate a voltage level of a power supply grid, a maximum voltage level can be used to detect overvoltage conditions on the power grid that could damage circuits, generate excessive power consumption, and the like.

In various embodiments, optional ESD circuit 703 is configured to clamp a voltage level on pad 702 during an ESD event. During manufacture or handling of an integrated circuit that includes selection circuit 700, static charge can build up on equipment or personnel. Such static charge can be transferred to the integrated circuit resulting in large currents that can damage circuitry within the integrated circuit. To clamp the voltage level on pad 702, optional ESD circuit 703 may be further configured to provide a conduction path to ground or to another power supply pad to provide a path for currents developed during an ESD event.

Figure 8:
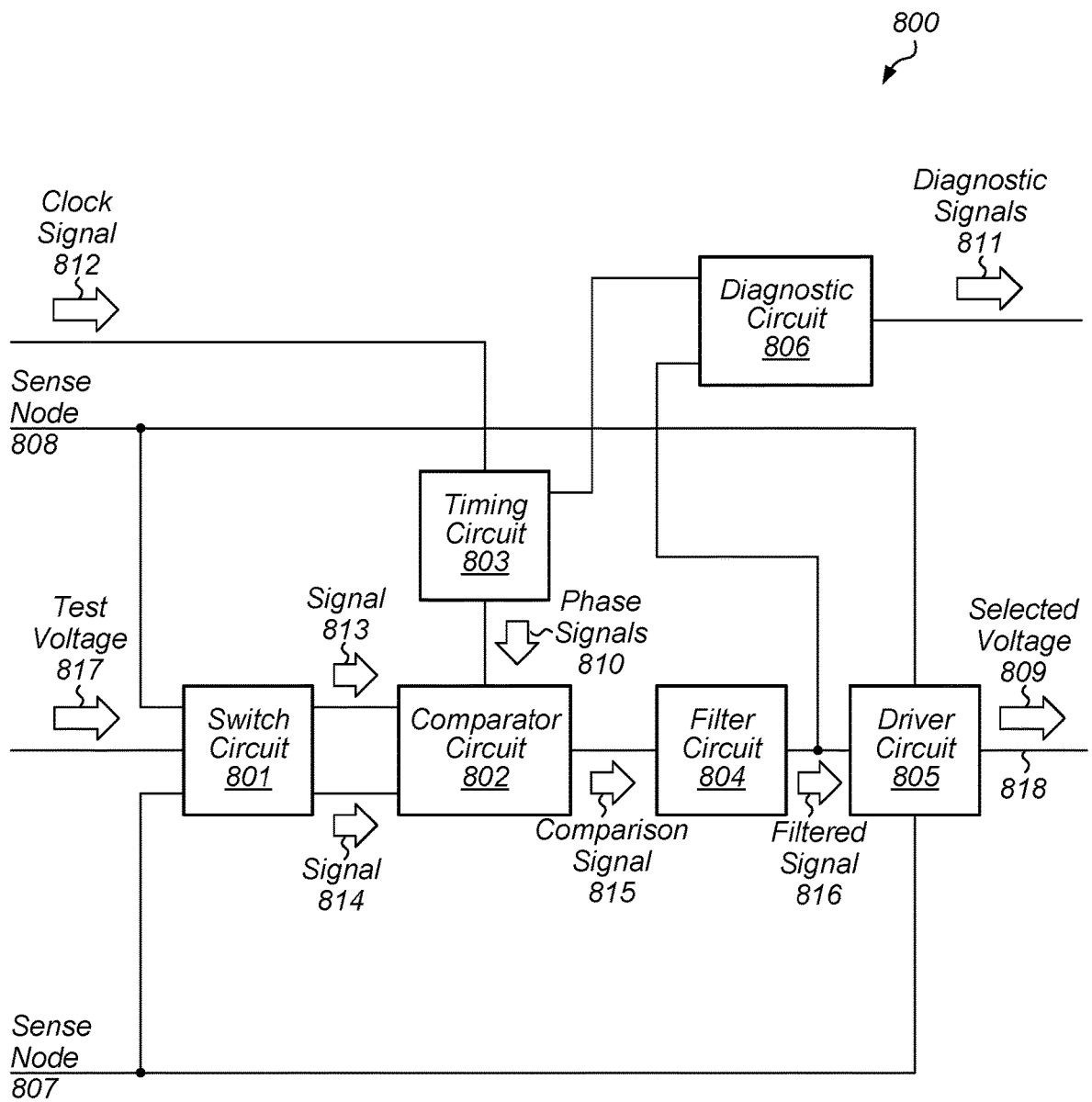
FIG. 8 is a block diagram of an embodiment of a monitor circuit for use in a selection circuit.

Turning to FIG. 8, a block diagram of an embodiment of a monitor circuit for use in a selection circuit is depicted. As illustrated, monitor circuit 800 includes switch circuit 801, comparator circuit 802, timing circuit 803, filter circuit 804, driver circuit 805, and diagnostic circuit 806. It is noted that monitor circuit 800 may, in various embodiments, correspond to any of monitor circuits 701A-701E as depicted in the embodiment of FIG. 7.

Switch circuit 801 is configured to generate signal 813 and signal 814 using the voltage levels of sense node 808 and sense node 807. In various embodiments, switch circuit 801 is configured to couple test voltage 817 across the input to comparator circuit 802 such that a difference in the voltage levels of signal 813 and signal 814 corresponds to a value of test voltage 817. By providing a known offset between signals 813 and 814, operation of comparator circuit 802 can be tested and/or calibrated.

Comparator circuit 802 is configured to compare respective values of signals 813 and 814 using phase signals 810 to generate comparison signal 815. In some cases, comparison signal 815 may include a stream of samples that indicate which of signals 813 and 814 has a smaller value when a corresponding sample was taken. In various embodiments, respective frequencies of phase signals 810 can determine a sensitivity of comparator circuit 802 to noise on signals 813 and 814. For example, increasing the respective frequencies of phase signals 810 can increase the sensitivity of comparator circuit 802 to rapid transients on signals 813 and 814. In various embodiments, comparator circuit 802 may be implemented using a differential amplifier circuit whose output is sampled by a sample circuit using phase signals 810.

Timing circuit 803 is configured to generate phase signals 810 using clock signal 812. In various embodiments, timing circuit 803 may be further configured to adjust respective frequencies of phase signals 810. It is noted that timing circuit 803 may be configured to generate any suitable number of phase signals based on the design of comparator circuit 802. Timing circuit 803 may, in various embodiments, be implemented using multiple delay circuits, delay-locked loop circuits, phase-locked loop circuits, or any other suitable circuits configured to generate multiple phase signals with adjustable frequencies.

In some cases, the noise may induce undesirable spurious sense samples. Filter circuit 804 is configured to filter comparison signal 815 to suppress such spurious sense samples to generate filtered signal 816. In various embodiments, the depth and latency of filter circuit 804 may be adjusted. As used and defined herein, depth refers to a minimum number of spurious samples that are to be suppressed, and latency refers to a maximum number of opposite-polarity samples that are needed to impact the selection of the minimum respective voltage levels of sense node 808 and sense node 807.

Driver circuit 805 is configured to couple, based on filtered signal 816, either sense node 808 or sense node 807 to node 818 to generate selected voltage 809. In various embodiments, driver circuit 805 is configured to adjust a conductance between either sense node 808 and node 818, or sense node 807 and node 818. In some cases, driver circuit 805 may be implemented using multiple analog pass gate circuits, or other suitable circuits, coupled together in a wired-OR fashion. In various embodiments, different numbers of the analog pass gate circuits may be enabled based on a desired conductance between a selected one of sense nodes 808 or 807 and node 818.

Diagnostic circuit 806 is configured to generate diagnostic signals 811. In various embodiments, diagnostic signals 811 may include information indicative of a frequency of phase signals 810 that are used to perform the sampling of signals 813 and 814. Alternatively, or additionally, diagnostic signals 811 may include information indicative of filtered signal 816 which controls the switch from sense node 808 to sense node 807, and vice-versa, by driver circuit 805.

Figure 9:
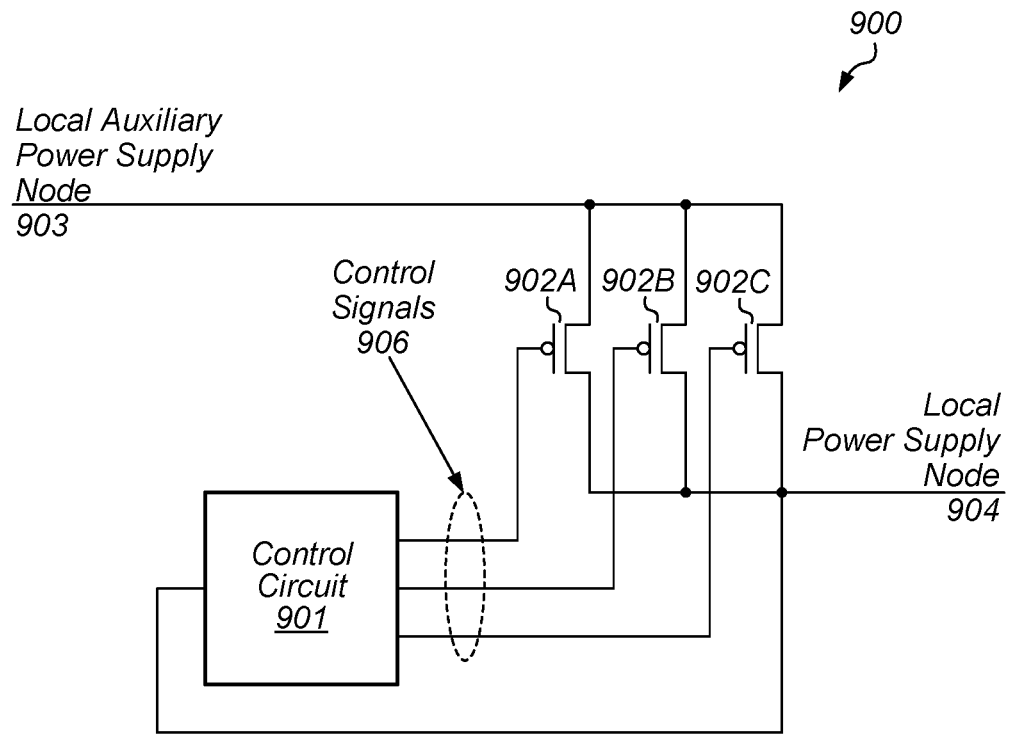
FIG. 9 is a block diagram of an embodiment of a low-dropout voltage regulator circuit.

Turning to FIG. 9, a block diagram of an embodiment of low-dropout voltage regulator circuit is depicted. As illustrated, regulator circuit 900 includes control circuit 901 and devices 902A-902C. In various embodiments, regulator circuit 900 may correspond to any of regulator circuits 603A-603C as depicted in FIG. 6.

Device 902A is coupled between local auxiliary power supply node 903 and local power supply node 904, and is controlled by one of control signals 906. In a similar fashion, devices 902B and 902C are coupled between local auxiliary power supply node 903 and local power supply node 904, and controlled by corresponding ones of control signals 906. Although three devices are depicted in the embodiment of FIG. 9, in other embodiments, any suitable number of devices may be employed.

By activating different combinations of devices 902A-902C, the conductance between local auxiliary power supply node 903 and local power supply node 904 may be varied. For example, activating all three of devices 902A-902C results in a larger conductance than activating only one of devices 902A-902C. By varying the conductance, the voltage level on local power supply node 904 may be adjusted to a desired level.

In various embodiments, devices 902A-902C may be implemented using p-channel MOSFETs, FinFETs, GAAFETs, or any other suitable transconductance devices. It is noted that in some embodiments, the electrical characteristics of devices 902A-902C may be different. For example, in some cases, device 902B may have twice the conductance, when activated, as that of device 902A.

Control circuit 901 is configured to generate control signals 906 using a voltage level of local power supply node 904. As described below, to generate control signals 906, control circuit 901 may be configured to perform a comparison of the voltage level of local power supply node 904 to a reference voltage generated using the voltage level of local power supply node 904, and activate particular ones of control signals 906 based on a result of the comparison. It is noted that in some embodiments, control circuit 901 may be configured to employ an external reference voltage (not shown) rather than generating a reference voltage using the voltage level of local power supply node 904.

Figure 10:
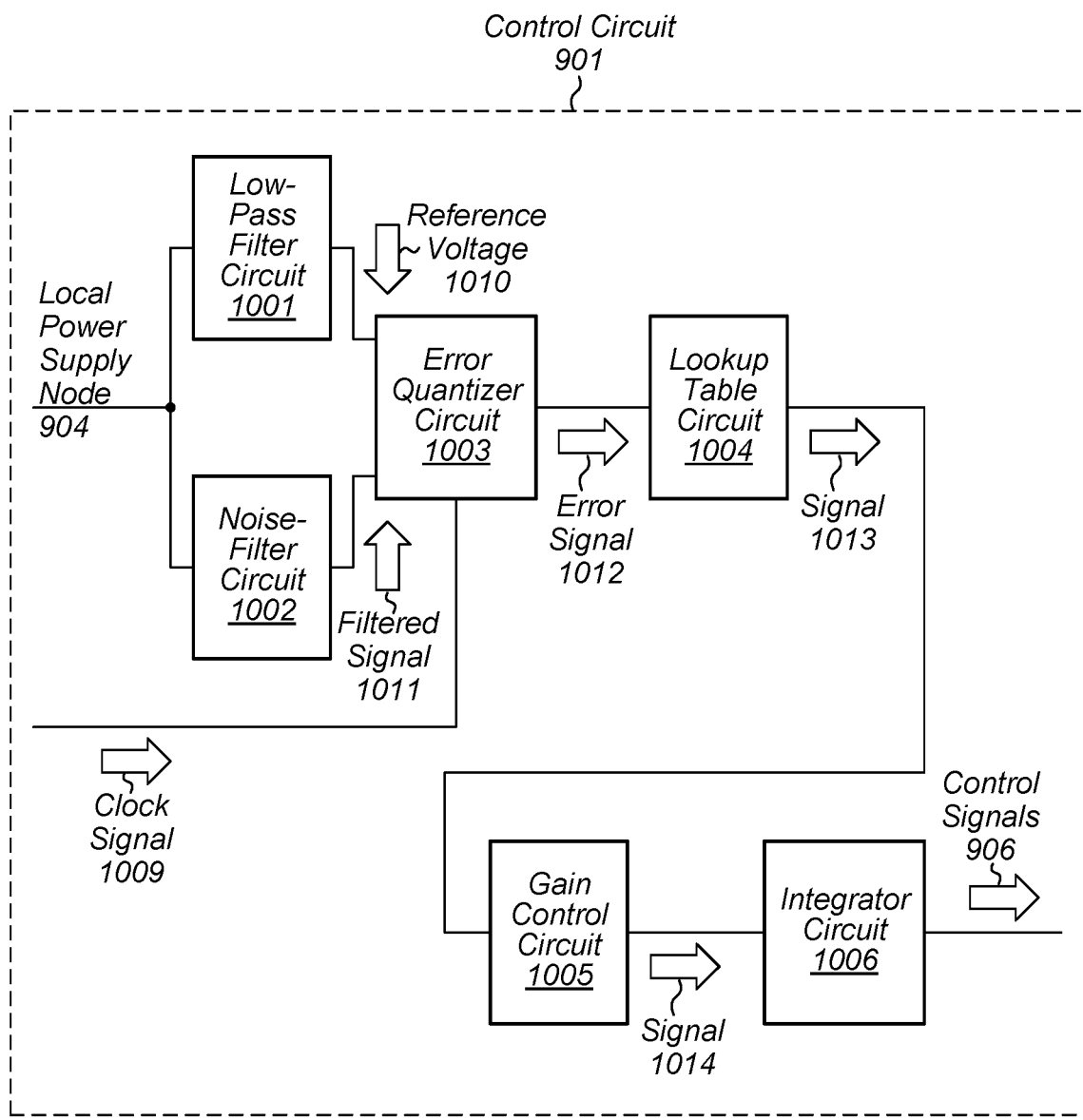
FIG. 10 is a block diagram of an embodiment of a control circuit for a low-dropout voltage regulator circuit.

Turning to FIG. 10, a block diagram of control circuit 901 is depicted. As illustrated, control circuit 901 includes low-pass filter circuit 1001, noise filter circuit 1002, error quantizer circuit 1003, lookup table circuit 1004, gain control circuit 1005, and integrator circuit 1006.

Low-pass filter circuit 1001 is configured to generate reference voltage 1010 by performing a low-pass filter operation on a voltage level of local power supply node 904. In various embodiments, low-pass filter circuit 1001 may be further configured to subtract a programmable offset from the voltage level of local power supply node 904 during the low-pass filter operation. Low-pass filter circuit 1001 may be implemented using one or more capacitors, one or more voltage sources, or any other suitable passive or active circuit components.

Noise-filter circuit 1002 is configured to generate filtered signal 1011 by performing a high-frequency filter operation on the voltage level of local power supply node 904. In various embodiments, noise-filter circuit 1002 may be further configured to attenuate frequency components of the voltage level of local power supply node 904 above a threshold frequency. In various embodiments, noise-filter circuit 1002 may be implemented using one or more resistors, one or more capacitors, or any other suitable combination of passive and active circuit components.

Error quantizer circuit 1003 is configured to generate error signal 1012 using reference voltage 1010 and filtered signal 1011. In various embodiments, to generate error signal 1012, error quantizer circuit 1003 may be configured to generate a number of bits whose value corresponds to a difference between reference voltage 1010 and filtered signal 1011. Error quantizer circuit 1003 may, in various embodiments, be implemented using an analog-to-digital converter circuit or any other suitable circuit configured to generate multiple bit based on a comparison of two or more analog signals.

Lookup table circuit 1004 is configured to generate signal 1013 using error signal 1012. In some embodiments, signal 1013 may correspond to a number of devices 902A-902C to activate based on the value of error signal 1012. In various embodiments, lookup table circuit 1004 may be configured to retrieve multiple bits from a storage circuit based on a value of error signal 1012. Lookup table circuit 1004 may, in different embodiments, be implemented using a static random-access memory circuit, a register file circuit, or any other suitable type of storage circuit.

Gain control circuit 1005 is configured to generate signal 1014 using signal 1013. In various embodiments, gain control circuit 1005 is further configured to increase or decrease a value of signal 1013 to generate signal 1014. By adjusting the value of signal 1013, the impact of a number of devices 902A-902C activated by signal 1013 can be increased or decreased, possibly providing a finer level of control than what is available from lookup table circuit 1004.

Integrator circuit 1006 is configured to generate control signals 906 using signal 1014. In various embodiments, integrator circuit 1006 may be configured to combine a previous value of control signals 906 with a current value of signal 1014 to generate a new value of control signals 906. By employing previous values of control signals 906, integrator circuit 1006 is able to smooth out rapid changes in signal 1014 and generate control signals 906 to track a trend in the variation of the voltage level of local power supply node 904. In various embodiments, integrator circuit 1006 includes a saturation circuit which limits both a maximum value and a minimum value of control signals 906 to prevent adder overflow when a previous value is combined with a current value.

Figure 11:
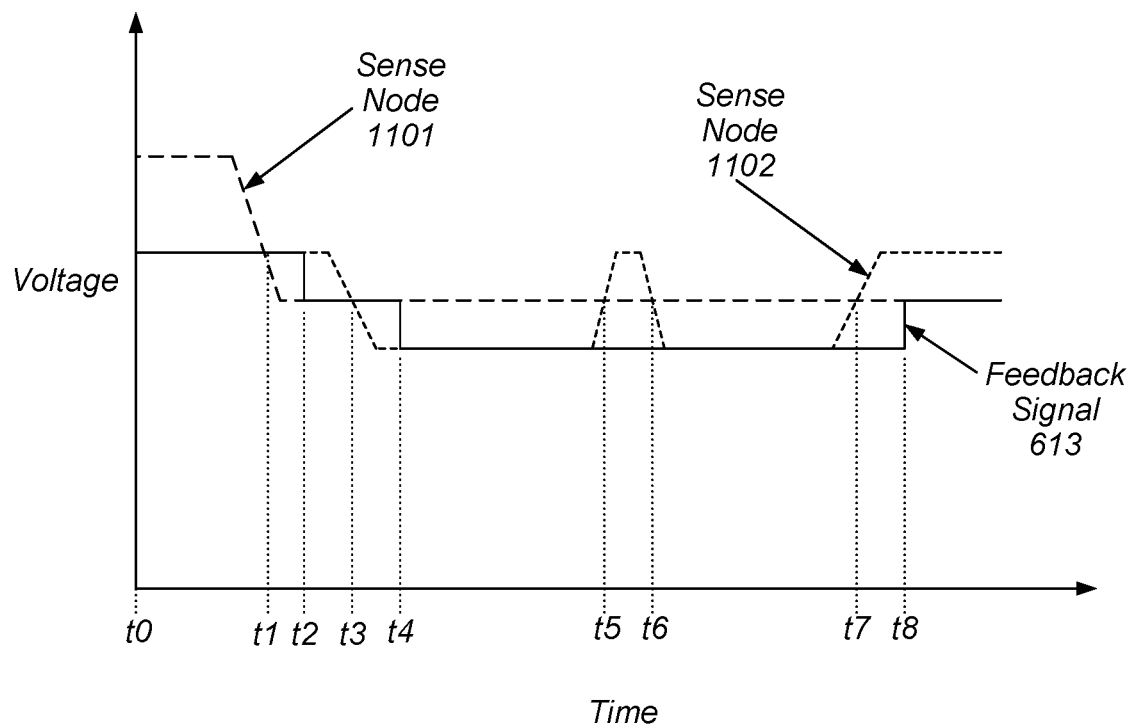
FIG. 11 illustrates waveforms associated with monitoring a power grid in a power delivery system.

Turning to FIG. 11, example waveforms associated with the operation of a monitor circuit are depicted. It is noted that waveforms of FIG. 11 are merely examples and, in other embodiments, such waveforms may have different behavior with respect to both time and voltage.

At time t0, the voltage of sense node 1101 is greater than the voltage of sense node 1102, and the value of feedback signal 613 is the same as the voltage level of sense node 1102 since it is the smaller of the respective voltages of sense nodes 1101 and 1102. It is noted that sense nodes 1101 and 1102 may, in various embodiments, correspond to any of local power supply nodes 610A-610C as depicted in the embodiment of FIG. 6.

At time t1, the voltage level of sense node 1101 becomes less than the voltage of sense node 1102. In response to the change in the voltage level of sense node 1101, feedback signal 613 changes value, i.e., becomes coupled to sense node 1101, at time t2.

The delay between time t1 and time t2 is referred to as the "latency time" of a monitor circuit. The latency time depends on the respective frequencies of phase signals 810 and corresponds to an amount of time the voltage levels of the sense nodes must remain in their new values before feedback signal 613 changes. By using a latency time, a monitor circuit, e.g., monitor circuit 800, can ignore noise on the sense nodes and only change the value of feedback signal 613 in response to non-noise changes in the voltage levels of the sense nodes. In various embodiments, the duration of the latency time may be programmable to account for the noise level within a particular computer system implementation.

At time t3, the voltage of sense node 1102 becomes less than the voltage of sense node 1101. After the latency time has passed, at time t4, feedback signal 613 changes value to the new voltage of sense node 1102.

Between time t5 and time t6, the voltage level of sense node 1102 increases above the voltage level of sense node 1101. The time period between times t5 and t6 is, however, less than the latency time, so the value of feedback signal 613 does not change.

At time t7, the voltage level of sense node 1102 becomes greater than the voltage level of sense node 1101. At time t8, the latency time has passed, and the voltage level of sense node 1102 is still greater than the voltage level of sense node 1101, so feedback signal 613 changes to match the voltage level of sense node 1101.

Figure 12:
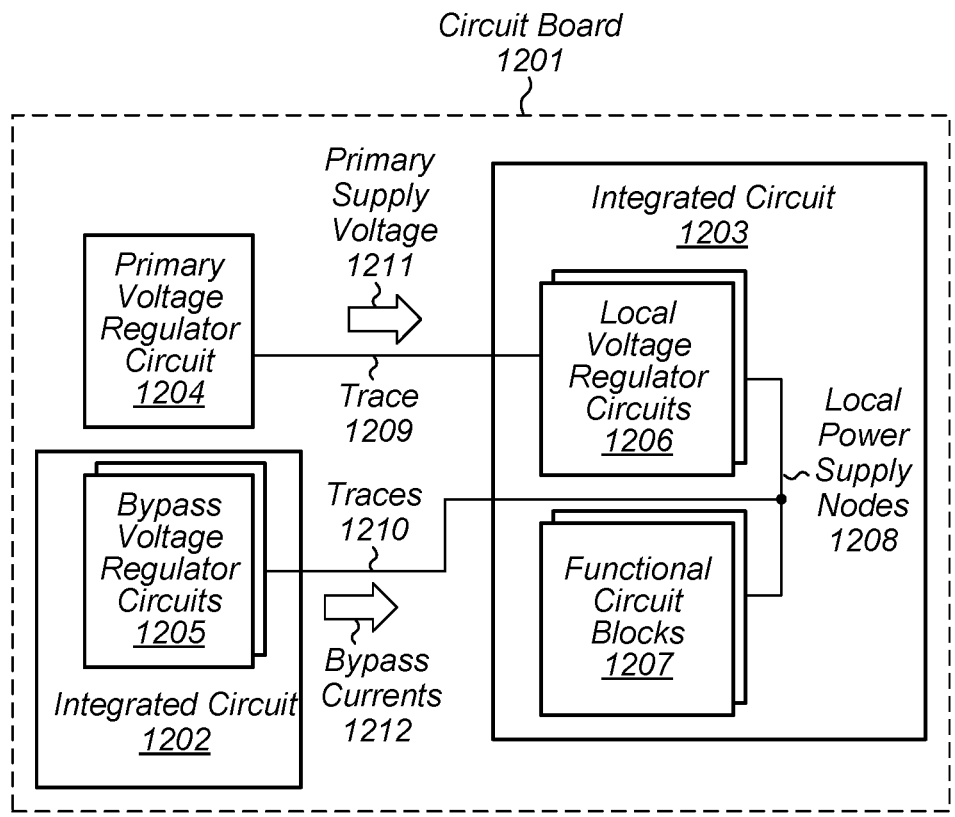
FIG. 12 illustrates a block diagram of an embodiment of a circuit board included in a computer system.

In computer systems, integrated circuits and voltage regulator circuits can be mounted on a common circuit board or substrate. The arrangements of voltage regulator circuits and integrated circuits on such a common circuit board or substrate can vary from one computer system to another. A block diagram of one embodiment of voltage regulator circuits and integrated circuits coupled to a common circuit board or substrate is depicted in FIG. 12.

Integrated circuit 1202 includes bypass voltage regulator circuits 1205, which are configured to source bypass currents 1212 to traces 1210. Traces 1210 can, in some embodiments, be implemented as strips of a conductive material deposited on circuit board 1201. In various embodiments, bypass voltage regulator circuits 1205 may correspond to bypass voltage regulator circuits 102 as depicted in FIG. 1. Although only two bypass voltage regulator circuits are depicted as being included in integrated circuit 1202, in other embodiments, any suitable number of bypass voltage regulator circuits may be employed. It is noted that integrated circuit 1202 can include other circuit blocks, e.g., microcontroller circuits, sensor circuits, and the like, that can be used in the power management of integrated circuit 1203.

Integrated circuit 1203 includes local voltage regulator circuits 1206, which are configured to generate corresponding voltage levels on local power supply nodes 1208. Each of local power supply nodes 1208 is coupled to a corresponding one of traces 1210 via a solder bump, solder ball, or other suitable connection material or technique. Although only two local voltage regulator circuits are depicted as being included in integrated circuit 1203, in other embodiments, any suitable number of local voltage regulator circuits may be employed.

Integrated circuit 1203 also includes functional circuit blocks 1207. Each of functional circuit blocks 1207 is coupled to a corresponding one of local power supply nodes 1208. In various embodiments, functional circuit blocks 1207 may include a processor circuit, a memory circuit, or any other suitable combination of analog and/or digital circuits. Although only two functional circuit blocks are depicted as being included in integrated circuit 1203, in other embodiments, any suitable number of functional circuit blocks may be employed. It is noted that, in some cases, more than one functional circuit block may be coupled to a given one of local power supply nodes 1208.

Although only two integrated circuits and a single primary regulator circuit are shown being coupled to circuit board 1201 in the embodiment of FIG. 12, in other embodiments, additional integrated circuits and/or other power-related circuits may be coupled to circuit board 1201.

Figure 13:
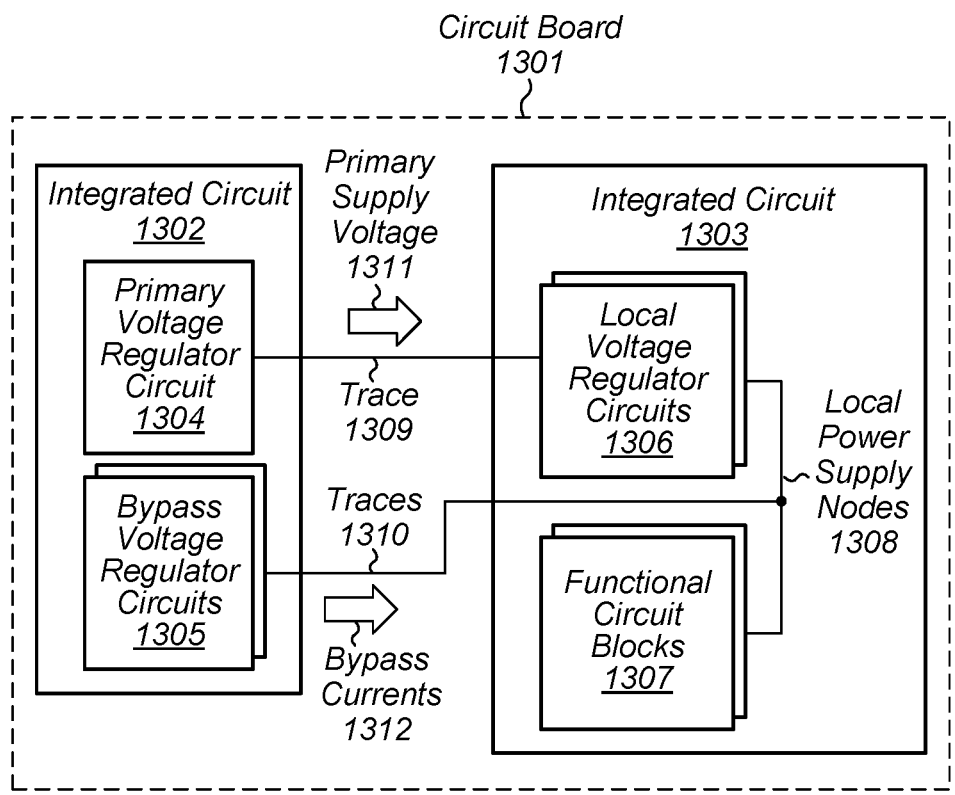
FIG. 13 illustrates a block diagram of another embodiment of a circuit board included in a computer system.

Turning to FIG. 13, a block diagram of another embodiment of a circuit board for a computer system is depicted. As illustrated, circuit board 1301 includes integrated circuit 1302 and integrated circuit 1303.

Integrated circuit 1302 includes primary voltage regulator circuit 1304 and bypass voltage regulator circuits 1305. In various embodiments, primary voltage regulator circuit 1304 may correspond to primary voltage regulator circuit 101, and bypass voltage regulator circuits 1305 may correspond to bypass voltage regulator circuits 102 as depicted in FIG. 1. It is noted that integrated circuit 1302 can include other circuit blocks, e.g., microcontroller circuits, sensor circuits, and the like, that can be used in the power management of integrated circuit 1303.

Primary voltage regulator circuit 1304 is configured to generate primary supply voltage 1311 on trace 1309, which is coupled to integrated circuit 1303. Trace 1309 can, in various embodiments, be implemented as a strip of a conductive material deposited on circuit board 1301. In various embodiments, integrated circuit 1303 may be coupled to trace 1309 via a solder ball, solder bump, or using any other suitable connection material or technique.

Bypass voltage regulator circuits 1305 are configured to source bypass currents 1312 to traces 1310. Traces 1310 can, in some embodiments, be implemented as strips of a conductive material deposited on circuit board 1301. Although only two bypass voltage regulator circuits are depicted as being included in integrated circuit 1302, in other embodiments, any suitable number of bypass voltage regulator circuits may be employed.

Integrated circuit 1303 includes local voltage regulator circuits 1306, which are configured to generate corresponding voltage levels on local power supply nodes 1308. Each of local power supply nodes 1308 is coupled to a corresponding one of traces 1310 via a solder bump, solder ball, or other suitable connection material or technique. Although only two local voltage regulator circuits are depicted as being included in integrated circuit 1303, in other embodiments, any suitable number of local voltage regulator circuits may be employed.

Integrated circuit 1303 also includes functional circuit blocks 1307. Each of functional circuit blocks 1307 is coupled to a corresponding one of local power supply nodes 1308. In various embodiments, functional circuit blocks 1307 may include a processor circuit, a memory circuit, or any other suitable combination of analog and/or digital circuits. Although only two functional circuit blocks are depicted as being included in integrated circuit 1303, in other embodiments, any suitable number of functional circuit blocks may be employed. It is noted that, in some cases, more than one functional circuit block may be coupled to a given one of local power supply nodes 1308.

Although only two integrated circuits are shown being coupled to circuit board 1301 in the embodiment of FIG. 13, in other embodiments, additional integrated circuits and/or other power-related circuits may be coupled to circuit board 1301.

Figure 14:
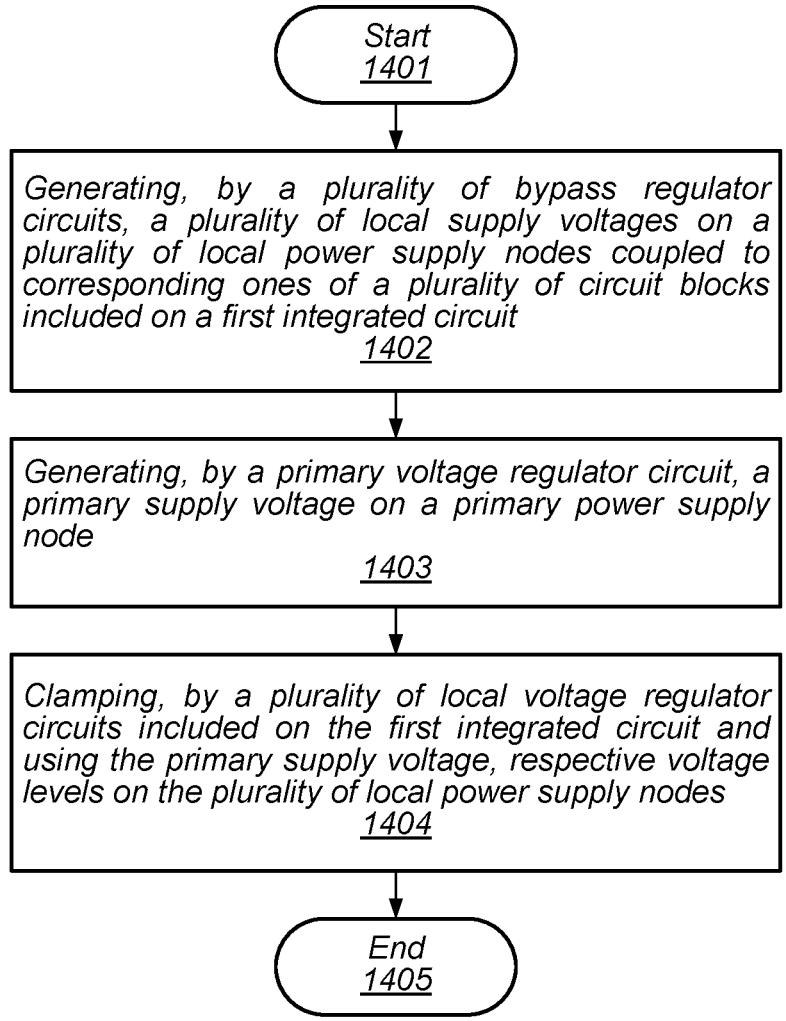
FIG. 14 illustrates a flow diagram depicting an embodiment of a method for using primary and bypass voltage regulator circuits to deliver power to an integrated circuit.

Turning to FIG. 14, a flow diagram depicting an embodiment of a method for using primary and bypass voltage regulator circuits to deliver power to an integrated circuit is illustrated. The method, which may be applied to computer system 100, begins in block 1401.

The method includes generating, by a plurality of bypass regulator circuits, a plurality of local supply voltages on a plurality of local power supply nodes coupled to corresponding ones of a plurality of circuit blocks included on a first integrated circuit (block 1402).

The method further includes generating, by a primary voltage regulator circuit, a primary supply voltage on a primary power supply node (block 1403). In various embodiments, the first integrated circuit, the primary regulator circuit, and the plurality of bypass regulator circuits are coupled to a common circuit board or substrate. Alternatively, in other embodiments, the plurality of bypass voltage regulator circuits are included in a second integrated circuit, and the first integrated circuit, the second integrated circuit, and the primary voltage regulator circuit are coupled to a common circuit board or substrate. In some cases, the primary voltage regulator circuit and the plurality of bypass voltage regulator circuits are included in a second integrated circuit that is coupled to a common circuit board along with the first integrated circuit.

The method also includes clamping, by a plurality of local voltage regulator circuits included on a first integrated circuit and using the primary supply voltage, respective voltage levels of the plurality of local power supply nodes (block 1404). In various embodiments, clamping the respective voltage levels of the plurality of local power supply voltages may include modifying a conductance between the primary power supply node and a particular local power supply node of the plurality of local power supply nodes based on a comparison of a voltage level of the particular local power supply node and a reference voltage.

In other embodiments, clamping the respective voltage levels of the plurality of local power supply nodes may include charging, by a particular local voltage regulator circuit, at least one capacitor using the primary supply voltage. In such cases, the method may further include discharging, by the particular local voltage regulator circuit, the at least one capacitor into a particular local power supply node of the plurality of local power supply nodes coupled to the particular local voltage regulator circuit.

In some embodiments, the method may also include decoupling, in response to detecting a power gating operation, a particular local voltage regulator circuit of the plurality of local voltage regulator circuits and a corresponding one of the plurality of bypass voltage regulator circuits from a corresponding one of the plurality of local supply nodes. The method may, in some cases, include generating, by the first integrated circuit, the power gating operation in response to detecting changes in temperature or other environmental parameters. Alternatively, the method may include receiving, by the first integrated circuit, the power gating operation from a power management integrated circuit or other suitable source outside the first integrated circuit.

The method further includes sourcing, by a plurality of bypass voltage regulator circuits, a plurality of bypass currents to the plurality of local power supply nodes (block

1404). In various embodiments, sourcing the plurality of bypass currents includes sensing a value for a particular bypass current of the plurality of bypass currents and limiting the particular bypass current based on a comparison of a sensed value of the particular bypass current to a threshold value. The method concludes in block 1405.

Figure 15:
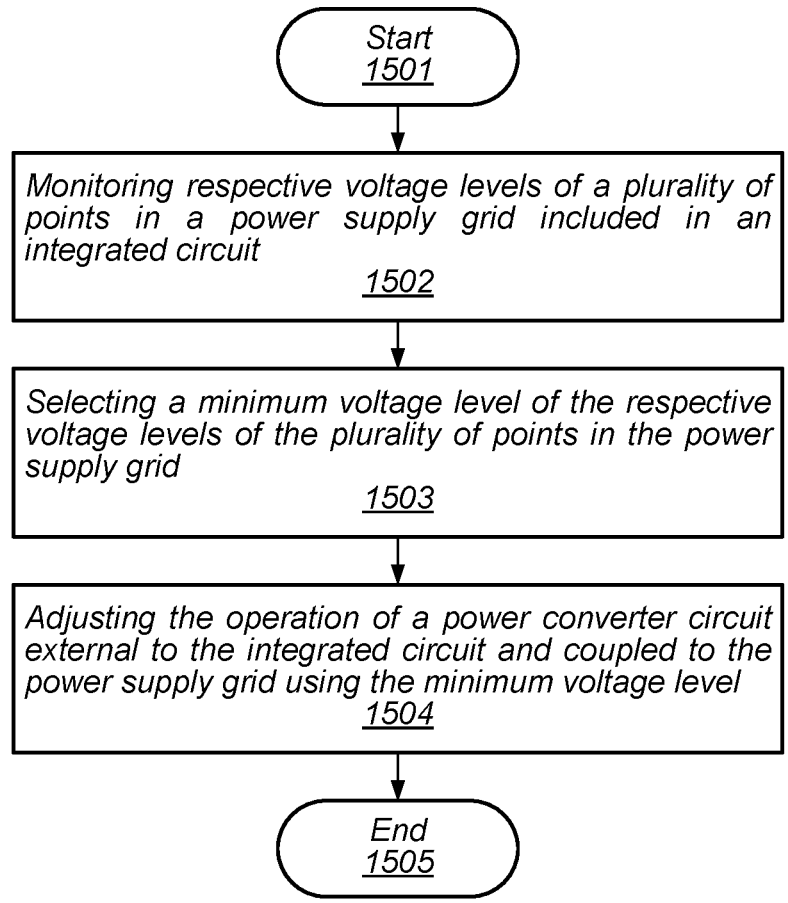
FIG. 15 illustrates a flow diagram depicting an embodiment of a method for using a minimum voltage level from multiple power grid sample points to regulate the voltage level of the power grid.

Turning to FIG. 15, a flow diagram depicting an embodiment of a method for using a minimum voltage level from multiple power grid sample points to regulate the voltage level of the power grid is illustrated. The method, which may be applied to various power delivery systems, e.g., power delivery system 600, begins in block 1501.

The method includes monitoring respective voltage levels of a plurality of points in a power supply grid included in an integrated circuit (block 1502). In various embodiments, the integrated circuit further includes a plurality of functional circuits coupled to the power supply grid. In other embodiments, a plurality of local regulator circuits are coupled to the power supply grid and the method may further include generating, by the plurality of local regulator circuits, a plurality of local supply voltages using a voltage level of the power supply grid.

The method also includes selecting a minimum voltage level of the respective voltage levels of the plurality of points in the power supply grid (block 1503). In various embodiments, selecting the minimum voltage level may include generating a plurality of phase signals using a clock signal and sampling, using the plurality of phase signals, a comparison of a first voltage level of a first point of the plurality of points to a second voltage level of a second point of the plurality of points. In such cases, the method may also including filtering a result of the sampling, and routing a selected one of the first voltage level or the second voltage level to a next monitor circuit.

The method further includes adjusting the operation of a power converter circuit external to the integrated circuit and coupled to the power supply grid using the minimum voltage level (block 1504). In various embodiments, adjusting the operation of the power converter circuit includes changing a duration of at least one cycle of a plurality of cycles used to operate the power converter circuit. The method concludes in block 1505.

Figure 16:
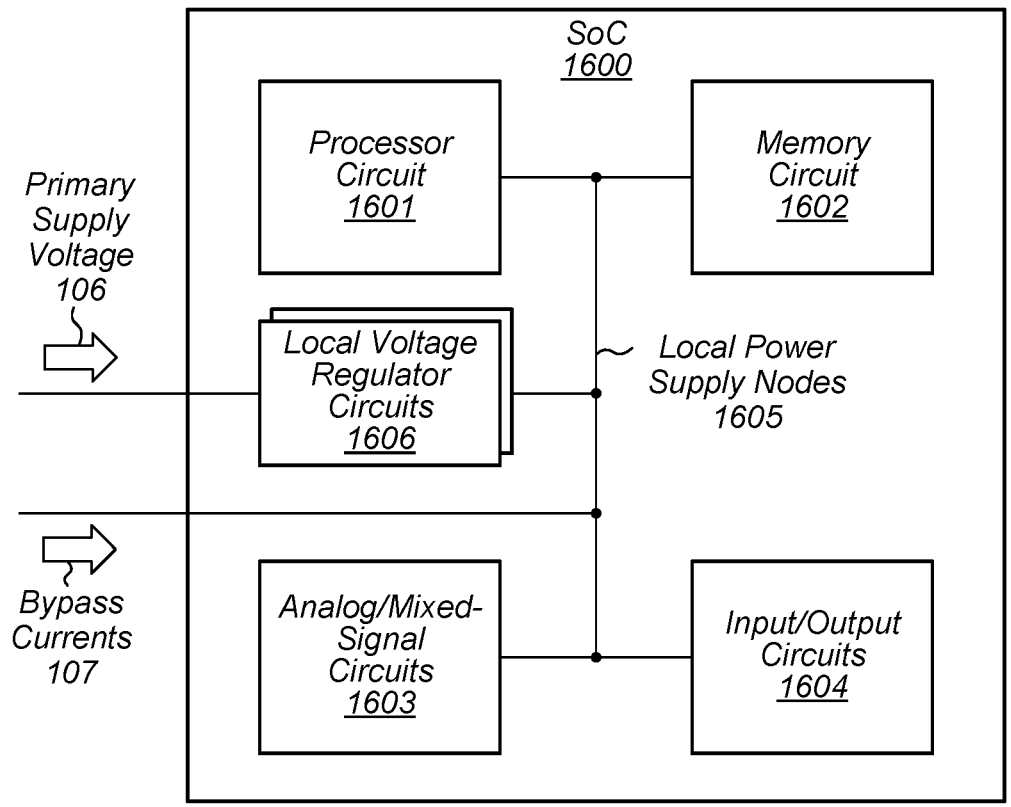
FIG. 16 is a block diagram of an embodiment of a system-on-a-chip.

A block diagram of a system-on-a-chip (denoted "SoC 1600") is illustrated in FIG. 16. In various embodiments, SoC 1600 may be configured for use in a desktop computer, server, or in a mobile computing application such as, e.g., a tablet, laptop computer, or wearable computing device. As illustrated, Soc 1600 includes processor circuit 1601, memory circuit 1602, analog/mixed-signal circuits 1603, input/output circuits 1604, and local voltage regulator circuits 1606, each of which is coupled to local power supply nodes 1605. It is noted that although processor circuit 1601, memory circuit 1602, analog/mixed-signal circuits 1603, and input/output circuits 1604 are depicted as being coupled to a particular one of local power supply nodes 1605, in other embodiments, different ones of processor circuit 1601, memory circuit 1602, analog/mixed-signal circuits 1603, or input/output circuits 1604 may be coupled to corresponding ones of local power supply nodes 1605.

Processor circuit 1601 may, in various embodiments, be representative of a general-purpose processor that performs computational operations. For example, processor circuit 1601 may be a central processing unit (CPU) such as a microprocessor, a microcontroller, an application-specific integrated circuit (ASIC), or a field-programmable gate array (FPGA). In some embodiments, processor circuit 1601 may include multiple processor cores (or simply "cores"), each coupled to a corresponding one of local power supply nodes 1605.

Memory circuit 1602 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 16, in other embodiments, any suitable number of memory circuits may be employed.

Analog/mixed-signal circuits 1603 may include a crystal oscillator circuit, a phase-locked loop circuit, an analog-to-digital converter (ADC) circuit, and a digital-to-analog converter (DAC) circuit (all not shown). In some embodiments, analog/mixed-signal circuits 1603 may include one or more sensor circuits configured to measure operating parameters (e.g., temperature) of SoC 1600.

Input/output circuits 1604 may be configured to coordinate data transfer between SoC 1600 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1604 may be configured to implement a version of Universal Serial Bus (USB) protocol or IEEE 1394 (Firewire®) protocol.

Input/output circuits 1604 may also be configured to coordinate data transfer between SoC 1600 and one or more devices (e.g., other computing systems or integrated circuits) coupled to SoC 1600 via a network. In one embodiment, input/output circuits 1604 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1604 may be configured to implement multiple discrete network interface ports.

As described above, local voltage regulator circuits 1606 are configured to generate corresponding voltages on local power supply nodes 1605 using primary supply voltage 106 and bypass currents 107. It is noted that in some embodiments, each of bypass currents 107 are applied to corresponding ones of local power supply nodes 1605.

Figure 17:
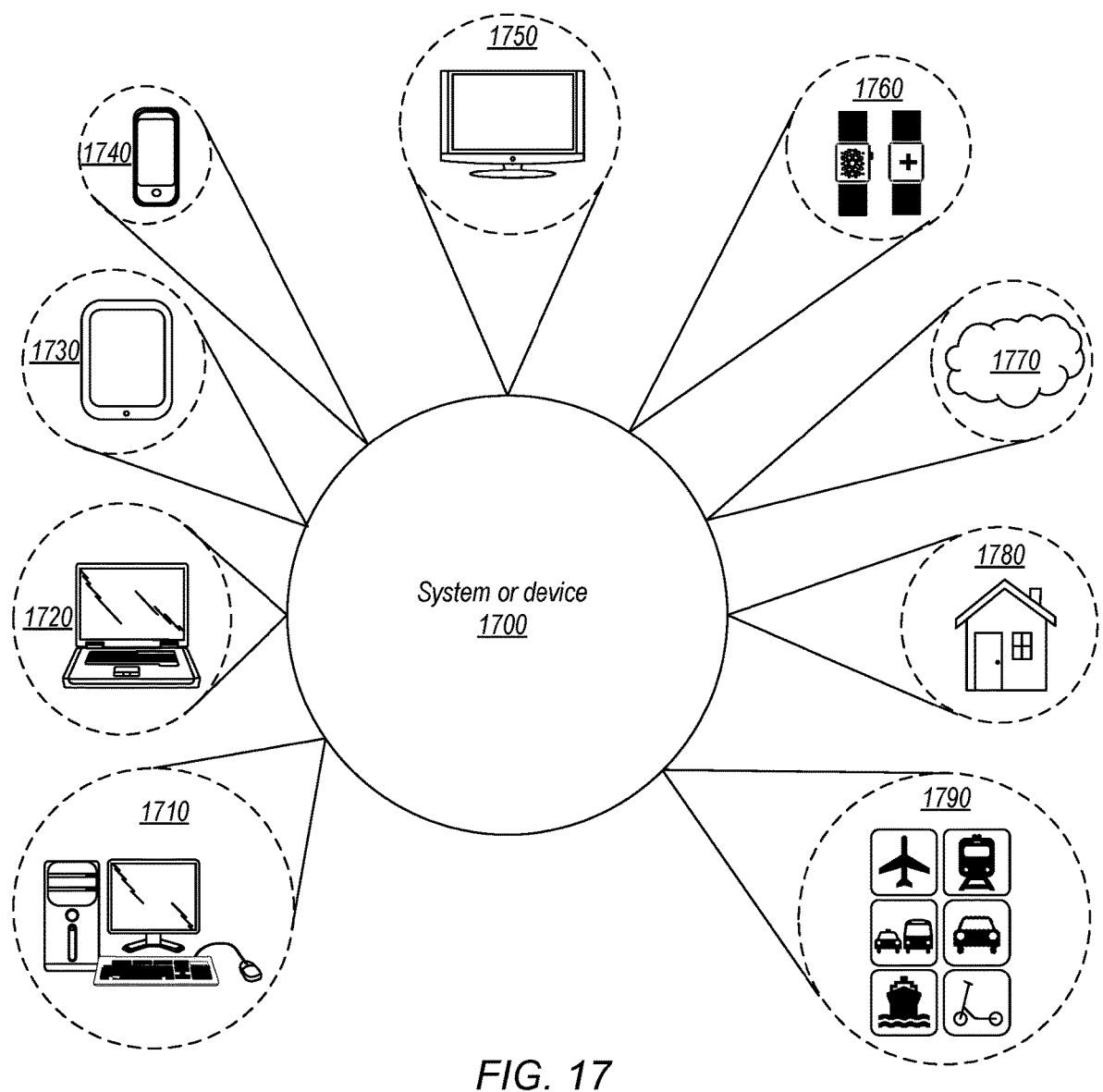
FIG. 17 is a block diagram of various embodiments of computer systems that may include primary and bypass regulator circuits.

Turning now to FIG. 17, various types of systems that may include any of the circuits, devices, or systems discussed above are illustrated. System or device 1700, which may incorporate or otherwise utilize one or more of the techniques described herein, may be utilized in a wide range of areas. For example, system or device 1700 may be utilized as part of the hardware of systems such as a desktop computer 1710, laptop computer 1720, tablet computer 1730, cellular or mobile phone 1740, or television 1750 (or set-top box coupled to a television).

Similarly, disclosed elements may be utilized in a wearable device 1760, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1700 may also be used in various other contexts. For example, system or device 1700 may be utilized in the context of a server computer system, such as a dedicated server or on shared hardware that implements a cloud-based service 1770. Still further, system or device 1700 may be implemented in a wide range of specialized everyday devices, including devices 1780 commonly found in the home such as refrigerators, thermostats, security cameras, etc. The interconnection of such devices is often referred to as the "Internet of Things" (IoT). Elements may also be implemented in various modes of transportation. For example, system or device 1700 could be employed in the control systems, guidance systems, entertainment systems, etc. of various types of vehicles 1790.

The applications illustrated in FIG. 17 are merely exemplary and are not intended to limit the potential future applications of disclosed systems or devices. Other example applications include, without limitation: portable gaming devices, music players, data storage devices, unmanned aerial vehicles, etc.

Figure 18:
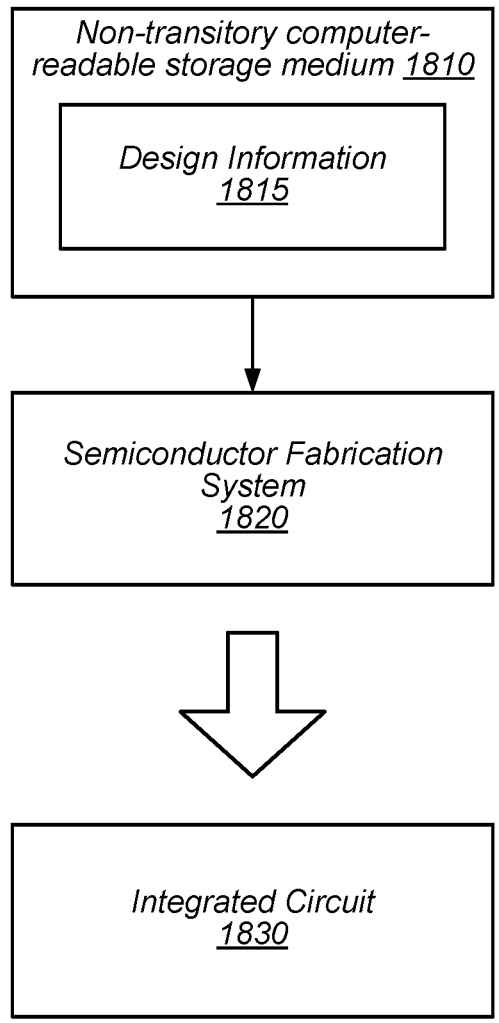
FIG. 18 illustrates an example of a non-transitory computer-readable storage medium that stores circuit design information.

FIG. 18 is a block diagram illustrating an example of a non-transitory computer-readable storage medium that stores circuit design information, according to some embodiments. In the illustrated embodiment, semiconductor fabrication system 1820 is configured to process design information 1815 stored on non-transitory computer-readable storage medium 1810 and fabricate integrated circuit 1830 based on design information 1815.

Non-transitory computer-readable storage medium 1810 may comprise any of various appropriate types of memory devices or storage devices. Non-transitory computer-readable storage medium 1810 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash memory, magnetic media, e.g., a hard drive, or optical storage; registers, or other similar types of memory elements, etc. Non-transitory computer-readable storage medium 1810 may include other types of non-transitory memory as well or combinations thereof. Non-transitory computer-readable storage medium 1810 may include two or more memory mediums, which may reside in different locations, e.g., in different computer systems that are connected over a network.

Design information 1815 may be specified using any of various appropriate computer languages, including hardware description languages such as, without limitation: VHDL, Verilog, SystemC, SystemVerilog, RHDL, M, MyHDL, etc. Design information 1815 may be usable by semiconductor fabrication system 1820 to fabricate at least a portion of integrated circuit 1830. The format of design information 1815 may be recognized by at least one semiconductor fabrication system, such as semiconductor fabrication system 1820, for example. In some embodiments, design information 1815 may include a netlist that specifies elements of a cell library, as well as their connectivity. One or more cell libraries used during logic synthesis of circuits included in integrated circuit 1830 may also be included in design information 1815. Such cell libraries may include information indicative of device or transistor level netlists, mask design data, characterization data, and the like, of cells included in the cell library.

Integrated circuit 1830 may, in various embodiments, include one or more custom macrocells, such as memories, analog or mixed-signal circuits, and the like. In such cases, design information 1815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1820 may also be configured to perform various testing of fabricated circuits for correct operation.

In various embodiments, integrated circuit 1830 is configured to operate according to a circuit design specified by design information 1815, which may include performing any of the functionality described herein. For example, integrated circuit 1830 may include any of various elements shown or described herein. Further, integrated circuit 1830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
    a primary voltage regulator circuit configured to generate a primary supply voltage on a primary power supply node;
    an integrated circuit including a plurality of functional blocks coupled to a plurality of local supply nodes; and
    a plurality of bypass regulator circuits configured to source a plurality of bypass currents to the plurality of local supply nodes, wherein:
    the integrated circuit further includes a plurality of local voltage regulator circuits including a particular local voltage regulator circuit configured to source, using the primary supply voltage, a supply current to a corresponding local supply node of the plurality of local supply nodes in response to a determination that a voltage level of the corresponding local supply node is less than a threshold value, and
    the particular local voltage regulator circuit includes a low-dropout regulator circuit coupled between the primary power supply node and a given functional block of the plurality of functional blocks.

2. The apparatus of claim 1, wherein the low-dropout regulator circuit is configured to adjust a conductance between the primary power supply node and a particular local supply node based on a comparison of a voltage level of the particular local supply node and a reference voltage.

3. The apparatus of claim 1, further comprising:
a second particular local voltage regulator circuit configured to source, using the primary supply voltage, a second supply current to a second corresponding local supply node of the plurality of local supply nodes in response to a second determination that a second voltage level of the second corresponding local supply node is less than the threshold value, wherein the second particular local voltage regulator circuit includes a capacitor, and wherein the second particular local voltage regulator circuit is configured to:
charge, during a first time period, the capacitor using the primary voltage level; and
discharge, during a second time period subsequent to the first time period, the capacitor into a second particular power supply node of the plurality of local supply nodes.

4. The apparatus of claim 1, wherein a particular bypass regulator circuit of the plurality of bypass regulator circuits includes a resistor coupled to a corresponding local supply node of the plurality of local supply nodes, and wherein the particular bypass regulator circuit further includes a switching circuit configured to source, using a voltage level of an input power node, a corresponding bypass current of the plurality of bypass currents to the corresponding local supply node via the resistor.

5. The apparatus of claim 4, wherein the particular bypass regulator circuit further includes a control circuit configured to:
measure a voltage drop across the resistor to determine a value of the corresponding bypass current; and
adjust operation of the switching circuit based on the value of the corresponding bypass current.

6. The apparatus of claim 1, wherein, while the supply current is sourced, a bypass current of the plurality of bypass currents is sourced.

7. A method, comprising:
generating, by a plurality of bypass regulator circuits, a plurality of local supply voltages on a plurality of local power supply nodes coupled to corresponding ones of a plurality of functional blocks included in a first integrated circuit;
generating, by a primary voltage regulator circuit, a primary supply voltage on a primary power supply node; and
clamping, by a plurality of local voltage regulator circuits included on the first integrated circuit and using the primary supply voltage, respective voltage levels on the plurality of local power supply nodes, wherein:
clamping the respective voltage levels on the plurality of local power supply nodes includes sourcing, by a particular local voltage regulator circuit using the primary supply voltage, a supply current to a corresponding local power supply node of the plurality of local power supply nodes in response to a determination that a voltage level of the corresponding local power supply node is less than a threshold value, and
the particular local voltage regulator circuit includes a low-dropout regulator circuit coupled between the primary power supply node and a given functional block of the plurality of functional blocks.

8. The method of claim 7, wherein clamping the respective voltage levels on the plurality of local power supply nodes includes modifying a conductance between the primary power supply node and a particular local power supply node of the plurality of local power supply nodes based on a comparison of a voltage level of the particular local power supply node and a reference voltage.

9. The method of claim 7, further comprising:
sourcing, by a second particular local voltage regulator circuit using the primary supply voltage, a second supply current to a second corresponding local power supply node of the plurality of local power supply nodes in response to a second determination that a second voltage level of the corresponding local power supply node is less than the threshold value, wherein sourcing the the second supply current includes:
charging, by the second particular local voltage regulator circuit of the plurality of local voltage regulator circuits, at least one capacitor using the primary supply voltage; and
discharging, by the second particular local voltage regulator circuit, the at least one capacitor into a second particular local power supply node of the plurality of local power supply nodes coupled to the second particular local voltage regulator circuit, the second particular local power supply node corresponding to the second particular local voltage regulator circuit.

10. The method of claim 7, further comprising decoupling, in response to detecting a power gating operation, a particular local voltage regulator circuit of the plurality of local voltage regulator circuits and a corresponding one of the plurality of bypass regulator circuits from a corresponding one of the plurality of local power supply nodes.

11. The method of claim 7, wherein the first integrated circuit, the primary voltage regulator circuit, and the plurality of bypass regulator circuits are coupled to a common circuit board.

12. The method of claim 7, wherein the primary voltage regulator circuit and the plurality of bypass regulator circuits are included in a second integrated circuit that is coupled to a common circuit board along with the first integrated circuit.

13. The method of claim 7, further comprising:
sourcing a plurality of bypass currents to the plurality of local power supply nodes, and
sourcing a bypass current of the plurality of bypass currents while the supply current is sourced.

14. An apparatus, comprising:
a primary power converter circuit configured to generate a primary supply voltage on a primary power supply node;
an auxiliary power converter circuit configured to generate an auxiliary supply voltage on an auxiliary power supply node; and
an integrated circuit including:
a first plurality of wiring networks coupled between the primary power supply node and a corresponding plurality of local power supply nodes;
a second plurality of wiring networks coupled between the auxiliary power supply node and a corresponding plurality of local auxiliary nodes;
a plurality of local voltage regulator circuits configured to source, using corresponding ones of the plurality of local auxiliary nodes, a plurality of currents to the plurality of local power supply nodes;
a plurality of functional circuit blocks coupled to the plurality of local power supply nodes; and
a selection circuit configured to select a particular one of the plurality of local power supply nodes to generate a feedback signal; and wherein the primary power converter circuit is further configured to adjust a value of the primary supply voltage using the feedback signal.

15. The apparatus of claim 14, wherein the plurality of local voltage regulator circuits includes a particular local voltage regulator circuit configured to adjust a conductance between a particular local auxiliary node of the plurality of local auxiliary nodes and a particular local power supply node of the plurality of local power supply nodes using a voltage level of the particular local power supply node.

16. The apparatus of claim 15, wherein the particular local voltage regulator circuit includes a plurality of devices coupled between the particular local auxiliary node and the particular local power supply node, and wherein to adjust the conductance between the particular local auxiliary node and the particular local power supply node, the particular local voltage regulator circuit is further configured to:
   perform a comparison of the voltage level of the local power supply node to a reference voltage; and
   activate one or more of the plurality of devices using a result of the comparison.

17. The apparatus of claim 16, wherein to perform the comparison, the particular local voltage regulator circuit is further configured to filter the voltage level of the local power supply node.

18. The apparatus of claim 14, wherein to select the particular one of the plurality of local power supply nodes, the selection circuit is further configured to:
   perform a comparison of respective voltage levels of the plurality of local power supply nodes; and
   select the particular one of the plurality of local power supply nodes using results of the comparison.

19. The apparatus of claim 18, wherein to select the particular one of the plurality of local power supply nodes, the selection circuit is further configured to couple the particular one of the plurality of local power supply nodes to a circuit node used for transmitting the feedback signal.

20. The apparatus of claim 18, wherein the selection circuit includes a monitor circuit configured to:
   generate a plurality of phase signals using a clock signal;
   perform a comparison of a first voltage level of a first local power supply node of the plurality of local power supply nodes and a second voltage level of a second local power supply node of the plurality of local power supply node using the plurality of phase signals;
   filter a result of the comparison to generate a filtered signal; and
   couple one of the first local power supply node or the second local power supply node to an output circuit node using the filtered signal.

* * * * *